United States Patent [19]
Fenwick et al.

[11] Patent Number: 5,737,546
[45] Date of Patent: Apr. 7, 1998

[54] SYSTEM BUS WITH SEPARATE ADDRESS AND DATA BUS PROTOCOLS

[75] Inventors: David M. Fenwick, Chelmsford; Denis J. Foley, Shrewsbury; Stephen R. Van Doren, Shrewsbury; Dale R. Keck, Shrewsbury, all of Mass.

[73] Assignee: Digital Equipment Corporation, Maynard, Mass.

[21] Appl. No.: 775,552

[22] Filed: Dec. 31, 1996

Related U.S. Application Data

[63] Continuation of Ser. No. 269,222, Jun. 30, 1994, abandoned.
[51] Int. Cl.$^6$ .......................... G06F 13/00; G06F 13/368
[52] U.S. Cl. ................ 395/290; 395/200.05; 395/200.13
[58] Field of Search ................................. 395/200.2, 309, 395/200, 290.14, 200.13, 200.05

[56] References Cited

U.S. PATENT DOCUMENTS

| | | | |
|---|---|---|---|
| 5,067,071 | 11/1991 | Schanin et al. | 395/27.5 |
| 5,235,685 | 8/1993 | Caldara et al. | 395/325 |
| 5,237,567 | 8/1993 | Nay et al. | 370/85.1 |
| 5,561,806 | 10/1996 | Fitchett et al. | 395/800 |

*Primary Examiner*—Jack B. Harvey
*Assistant Examiner*—Jeffrey K. Seto
*Attorney, Agent, or Firm*—Cathy L. Peterson; Ronald C. Hudgens; Arthur W. Fisher

[57] ABSTRACT

Bus interfaces for nodes coupled to a system bus in a computer system, the system bus including an address bus and a separate data bus. System bus operations include address and command transactions and data transactions. Data transactions occur on the data bus separately and independently of the occurrence of address and command transactions on the address bus. A bus interface may include any of a commander address bus interface means for providing to an address bus address and command transactions, a responder address bus interface means for acknowledging receipt of address and command transactions via the address bus, a commander data bus interface means for controlling submission to the data bus of data transactions as a result of the occurrence of address and command transactions on the address bus, and a responder data bus interface means for transferring data on the data bus during a data transaction. Data transactions occur on the data bus separately and independently of the occurrence of address and command transactions on the address bus. In particular, the timing of data transactions and the rate at which data transactions occur on the data bus is independent of the timing of address and command transactions and the rate at which address sub-transactions occur on the address bus.

12 Claims, 32 Drawing Sheets

SYSTEM BUS WITH SEPARATE ADDRESS AND DATA BUS PROTOCOLS

This application is a continuation of application Ser. No. 08/269,222, filed Jun. 30, 1994, now abandoned.

BACKGROUND OF THE INVENTION

The invention relates generally to computer systems, and more particularly to computer system bus protocols. As it is known in the art, computer systems generally include one or more nodes coupled to a system bus. The nodes can be of several types. Processor nodes generally include one or more CPUs which may have local caches associated with them. I/O nodes provide data transfer between the system bus and any of several I/O protocols for supporting various I/O devices such as hard disk drives and network interfaces. Memory nodes include one or several banks of dynamic RAM for access by the processor nodes and the I/O nodes.

Because the system bus is utilized in virtually every inter-node operation performed by the computer system, it is a key element whose characteristics have a major impact on the overall performance of the system. For instance, the speed at which the system bus is capable of transferring information from one node to another is a critical factor contributing to system performance. Presently used non-pended system busses typically employ a single bus protocol wherein a bus transaction has an address portion and a data portion, and wherein the contents and timing of each portion are varied depending upon the type of bus transaction occurring. These busses might be multiplexed, such that the address and data signals share the same bus signal lines during different time slots, or they might be de-multiplexed, wherein address signals and data signals are driven on separate bus signal lines. In either case, the typical protocol consists of a period of time for which address and command information is asserted on the bus by a node, followed by a period of time for which data is driven on the bus by a node, followed by a period of time in which new address and command information may be asserted by a node, etc. That is, the address and data portions of the protocol are dependent upon the completion of the preceding data or address portion.

The interdependency of the address and data portions of the typical system bus protocol can adversely affect the overall performance of the bus. For instance, where two nodes desire to initiate a transaction on a non-pipelined bus, both the address portion and the data portion of the bus protocol (and any overhead associated with each) must be completed for one node before the address portion may commence for the other node. On a pipelined bus, the address portion of a transaction may overlap the data portion of a previous transaction; however, times periods during which address portions and data portions may occur on the bus remain rigidly slotted and interdependent.

System performance can also be adversely affected by the bus flow control mechanisms provided. In the typical bus protocol where a bus transaction includes an address portion followed by a data portion, there is sometimes provided a flow control signal for affecting the length of time the data portion will last. Assertion of this flow control signal affects both the data portion of a cycle and the frequency with which address portions of cycles may be submitted to the bus, since data portions associated with the new address portions address portions cannot be executed until the previous data portion completes. Node access to the bus is thereby adversely restricted.

SUMMARY OF THE INVENTION

According to the principles of the invention, bus interfaces are provided for nodes coupled to a system bus in a computer system. The system bus includes an address bus and a separate data bus. System bus operations include address and command transactions and data transactions. Data transactions occur on the data bus separately and independently of the occurrence of address and command transactions on the address bus.

In accordance with one aspect of the present invention, there is provided a bus interface for a node in a computer system. The bus interface includes a commander address bus interface means for providing to an address bus address and command transactions. The bus interface also includes a responder address bus interface means for acknowledging receipt of address and command transactions Via the address bus. The bus interface further includes a commander data bus interface means for controlling submission to the data bus of data transactions as a result of the occurrence of address and command transactions on the address bus. Finally, the bus interface includes a responder data bus interface means for transferring data on the data bus during a data transaction.

According to another aspect of the invention, there is provided a computer system including a system bus having an address bus and a data bus. A plurality of nodes are coupled to the system bus. Each node may include a commander address bus interface means for providing to the address bus address and command transactions. Each node may also include a responder address bus interface means for acknowledging receipt of address and command transactions via the address bus. Each node may further include a commander data bus interface means for controlling submission to the data bus of data transactions as a result of the occurrence of address and command transactions on the address bus. Finally, each node may include a responder data bus interface means for transferring data on the data bus during a data transaction.

According to more particular aspects of the invention, the commander address bus interface means on each node include means for asserting an address bus flow control signal for controlling the rate at which address and command transactions are submitted to the address bus. The responder data bus interface means on each node include means for asserting a separate data bus flow control signal for controlling the rate at which data transactions occur on the data bus.

According to the principles of the invention, data transactions occur on the data bus separately and independently of the occurrence of address and command transactions on the address bus. In particular, the timing of data transactions and the rate at which data transactions occur on the data bus is independent of the timing of address and command transactions and the rate at which address sub-transactions occur on the address bus. The problems related to the interdependency of address and data portions of transactions on prior art busses are thereby overcome.

DETAILED DESCRIPTION OF THE PREFERRED EMBODIMENT

Figure 1:
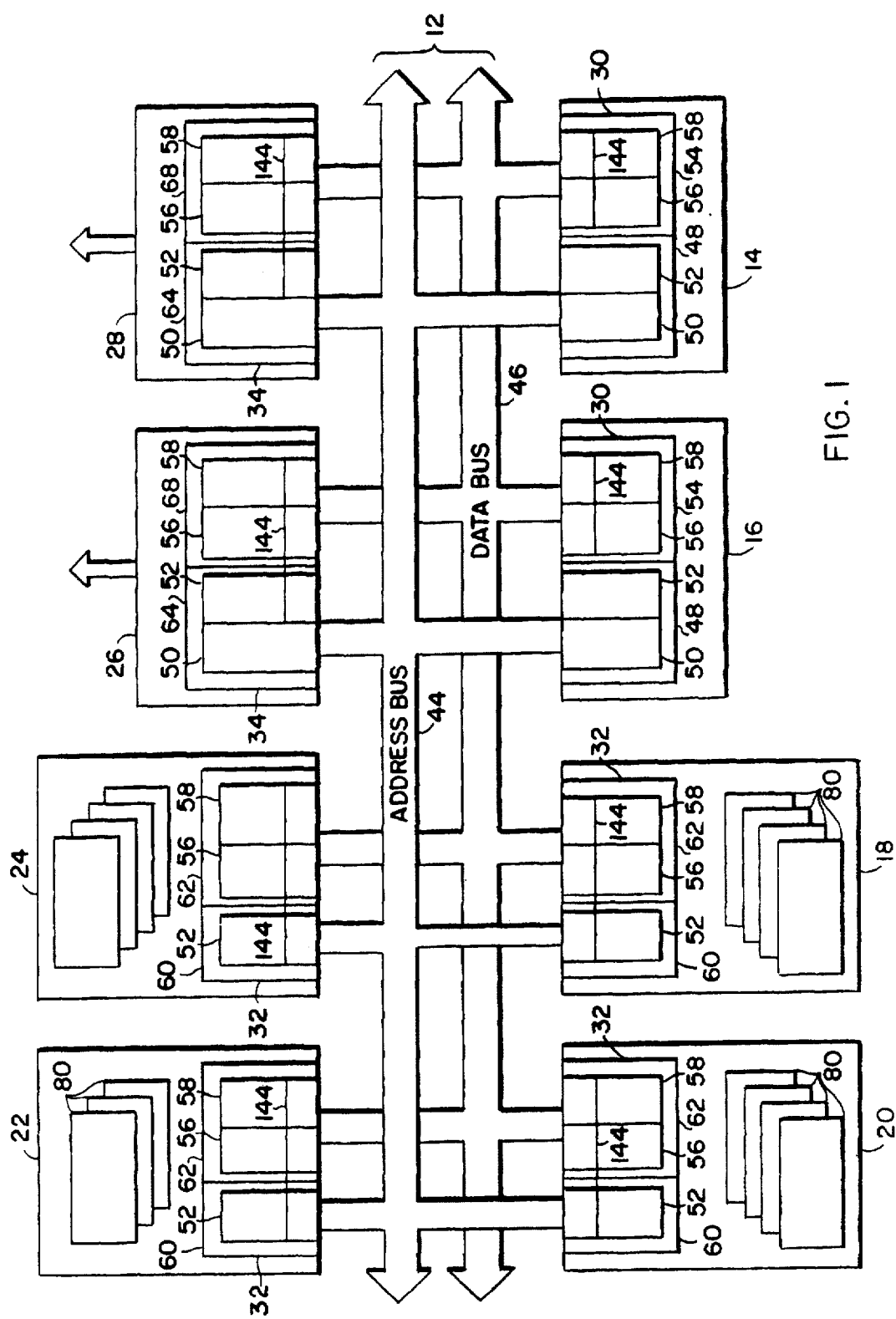
FIG. 1 is a block diagram of a multi-node computer system interconnected by a system bus having an address bus and a separate data bus.

Referring now to FIG. 1, there is shown an example of a computer system 10 embodying the present invention. The computer system 10 includes a system bus 12 which is a pipelined, non-pended, synchronous bus facilitating communication between several processors, memory subsystems, and I/O systems. Coupled to the system bus 12 are two processors 14 and 16, four memory subsystems 18, 20, 22, and 24, and two I/O units 26 and 28. The processors 14 and 16 are coupled to the system bus 12 via a processor system bus interface 30. Likewise, the memory subsystems 18, 20, 22, and 24 are coupled to the system bus 12 via a memory system bus interface 32, and I/O units 26 and 28 are each coupled to the system bus 12 via an I/O system bus interface 34.

Figure 2:
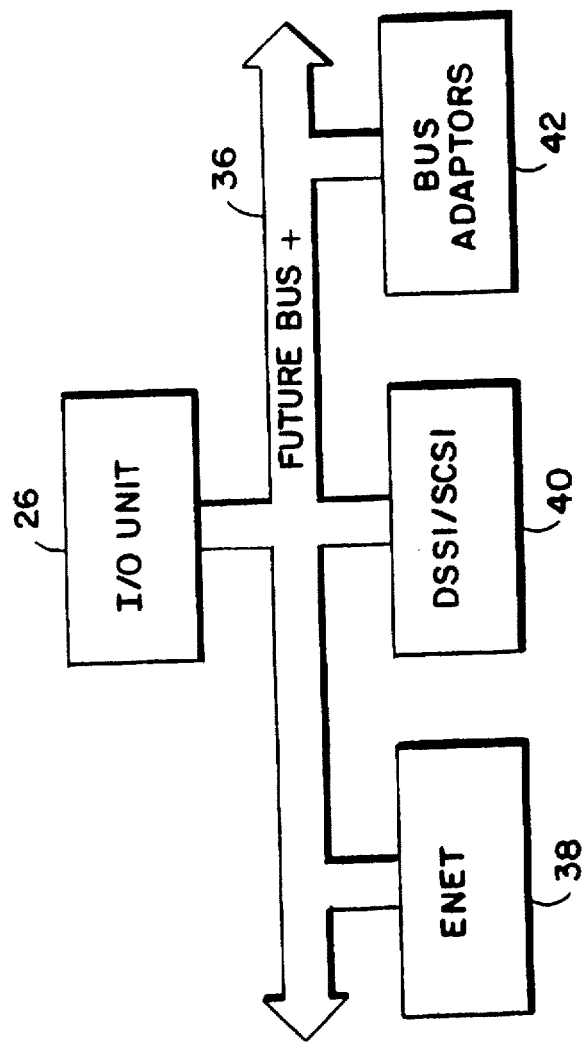
FIG. 2 is a block diagram of an I/O bus coupled to one of the I/O units of FIG. 1.

Referring to FIG. 2, the I/O unit 26 further interfaces the system bus 12 to various other I/O busses, such as a Futurebus+ 36, an Ethernet 38, a DSSI/SCSI bus 40, and other bus adaptors 42. It should be noted that more processors, memory subsystems, and/or I/O units can be coupled to the system bus 12.

According to the nomenclature used to describe the present invention, processors 14 and 16, memory subsystems 18, 20, 22, and 24, and I/O units 26 and 28 are all called nodes. A "node" is defined as a hardware device which connects to the system bus 12. According to the preferred embodiment, the system bus 12 may support nine nodes at once in varying configurations, with up to seven nodes being processor nodes like processor 14, up to seven nodes being memory nodes like memory subsystem 18, and up to five nodes being I/O nodes like I/O unit 26, and wherein the configuration always includes at least one processor node, one memory node, and one I/O node. The configuration of the computer system 10 as shown in FIG. 1 is therefore one possible configuration according to the preferred embodiment.

As seen in FIG. 1, according to the principles of the invention, the system bus 12 includes an address bus 44 and a data bus 46 separate from the address bus 44. Each processor system bus interface 30 includes a processor address bus interface 48 coupled to the address bus 44. The processor address bus interface 48 logically includes a commander address bus interface 50 and a responder address bus interface 52. Each processor system bus interface 30 also includes a processor data bus interface 54 coupled to the data bus 46, the processor data bus interface 54 logically including a commander data bus interface 56 and a responder data bus interface 58. Likewise, the memory system bus interfaces 32 include a memory address bus interface 60 having a responder address bus interface 52 coupled to the address bus 44, and include a memory data bus interface 62 having a commander data bus interface 56 and a responder data bus interface 58 coupled to the data bus 46. The I/O system bus interfaces 34 each include an I/O address bus interface 64 having a commander address bus interface 50 and a responder address bus interface 52 coupled to the address bus 44, and include an I/O data bus interface 66 having a commander data bus interface 56 and a responder data bus interface 58 coupled to the data bus 46.

According to the terminology used, the terms "signals" or "lines" are used interchangeably to refer to the names of the physical wires comprising the address bus and data bus. The terms "data" or "levels" are used to refer to the values which the signals or lines can assume. Asserted signals are represented as a high level, while de-asserted signals are represented with a low level in all timing diagrams, though it is understood that assertion levels are interchangeable as a matter of design choice.

A "system bus operation" (or "operation") is defined as a complete logical task being performed on the system bus 12. According to the principles of the invention, each system bus operation includes an address and command transaction occurring on the address bus 44, usually followed at some later time by a data transaction on the data bus 46.

A "commander" is defined as a node which has initiated a transaction currently in progress. A "responder" responds to the commander. Thus, address and command transactions are initiated on the address bus by an address bus commander. An address bus responder acknowledges receipt of the address and command information. Data transactions are initiated on the data bus by a data bus commander, and the data transfer is completed by data bus responders.

For example, consider a case where the processor node 14 needs to read data from memory on the memory node 18. The processor node 14 acts as an address bus commander for purposes of initiating an address and command transaction on the address bus 44 for providing the address in memory from which data is to be read. The memory node 18 acts as an address bus responder, acknowledging receipt of the memory address to be read. At some later time, the memory node 18 acts as a data bus commander in order to initiate a data transaction for transferring the requested data. The memory node 18 and the processor node 14 then act as data bus responders for the purpose of transferring the requested data from the memory node 18 to the processor node 14 in response to the initiation of the data transaction.

More particularly, the processor node 14 initiates the memory read operation by submitting an address and command transaction to the address bus 44 via its commander address bus interface 50. The memory node 18 acknowledges receipt of the address and command information via its responder address bus interface 52. Then, at some later time, the memory node 18 initiates a data transaction on the data bus 46. The memory node 18 then transfers the memory data onto the data bus 46 via its responder data bus interface 58, and the processor node 14 receives the data on the data bus via its responder data bus interface 58. Note, however, that the memory node 18 can be a data bus commander without being a data bus responder.

For example, in a computer system 10 where processor nodes 14 and 16 implement caches, the data requested by a processor node 14 from the memory node 18 might actually reside in cache on the processor node 16. In this case, the memory node 18 can act as a data bus commander for purposes of initiating the data bus transaction, but will not act as a data bus responder. Rather, the processor nodes 14 and 16 will act as data bus responders.

According to the principles of the invention, data transactions occur on the data bus 46 separately and independently of the occurrence of address and command transactions on the address bus 44; that is, the timing of data transactions and the rate at which data transactions are submitted to the data bus is independent of the timing of address and command transactions and the rate at which address and command transactions are submitted to the address bus.

Figure 3:
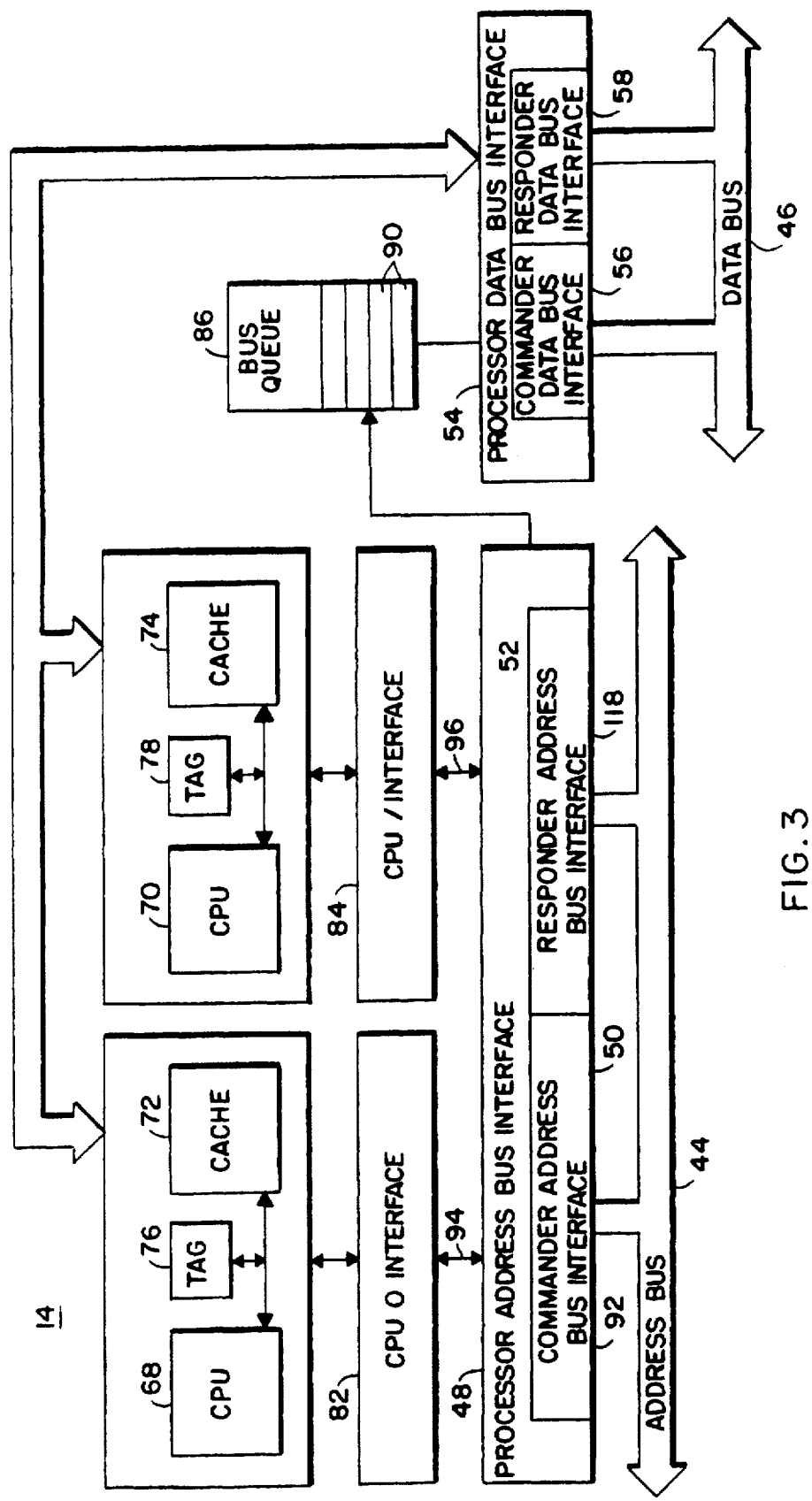
FIG. 3 is a block diagram of one of the processor nodes of FIG. 1.

According to the preferred embodiment, processor nodes 14 and 16 implement caches. Cache coherency must therefore be maintained as system bus operations occur. In FIG. 3 there is shown a block diagram of a processor node 14 of FIG. 1. The processor node 14 is a dual-processor node having two CPUs 68 and 70. Each CPU 68 and 70 has associated with it a cache 72 and 74 respectively. Each cache 72 and 74 has associated with it a tag store 76 and 78 respectively.

According to the preferred embodiment, cache coherency between the different processor nodes 14 and 16 and between different caches on the same processor node 14 is maintained by use of a caching protocol known in the art. Status bits are maintained in the tag stores 76 and 78 indicating the status of each data item currently stored in the cache. The system bus 12 is monitored to maintain and update the states of these status bits. Three status bits are associated with a particular data item stored in the cache memory: VALID, SHARED, and DIRTY. Furthermore, SHARED and DIRTY signals are driven on the data bus 46 by data bus responders to communicate cache status between nodes, as will be further described later. The status bits are defined as follows:

SHARED—If more than one cache in the system contains a copy of the data item. A cache element will transition into this state if a different CPU caches the same data item. That is, if a first interface determines that another cache on the bus is allocating a location for a data item that is already stored in the cache associated with the first interface, the first interface notifies the other interface by asserting a SHARED signal on the system bus, signaling the second interface to allocate the location in the shared state. When this occurs the first interface will also update the state of its copy of the data item to indicate that it is now in the shared state.

DIRTY—A cache entry is dirty if the data item held in that entry has been updated more recently than main memory. Thus, when a CPU writes to a location in its cache, it sets the DIRTY bit to indicate that it is now the latest copy of the data item. When the SHARED bit is asserted, the write is also submitted to the system bus.

VALID—If the cache entry has a copy of a valid data item in it. In other words, the stored data item is coherent with the latest version of the data item, as may have been written by one of the CPUs on a processor node in the computer system.

When a CPU sets the DIRTY bit for a particular block whose status is SHARED, processor nodes using a conditional write update protocol can choose to update their cache entries in response to the system bus write operation; however, the processor nodes according to the preferred embodiment invalidate their entries, and the status of the block becomes VALID./SHED./DIRTY (where '/' indicates de-assertion). However, it is understood that various other methods of maintaining cache coherency can be supported.

To describe the operation of the system bus 12, the operation of the address bus 44 is first considered with reference to the operation of commander address bus interfaces 50 and responder address bus interfaces 52 on the various nodes. The operation of the data bus 46 is then considered with reference to the operation of commander data bus interfaces 56 and responder data bus interfaces 58 on the various nodes.

1.0 Address Bus

The operation of the address bus 44 will first be described with reference to the timing diagrams of FIGS. 4, 5 and 6. The bus interface circuitry for providing the bus timing will then be described with reference to the block diagrams of FIGS. 3 and 7 and the flow diagram of FIG. 8.

Figure 4:
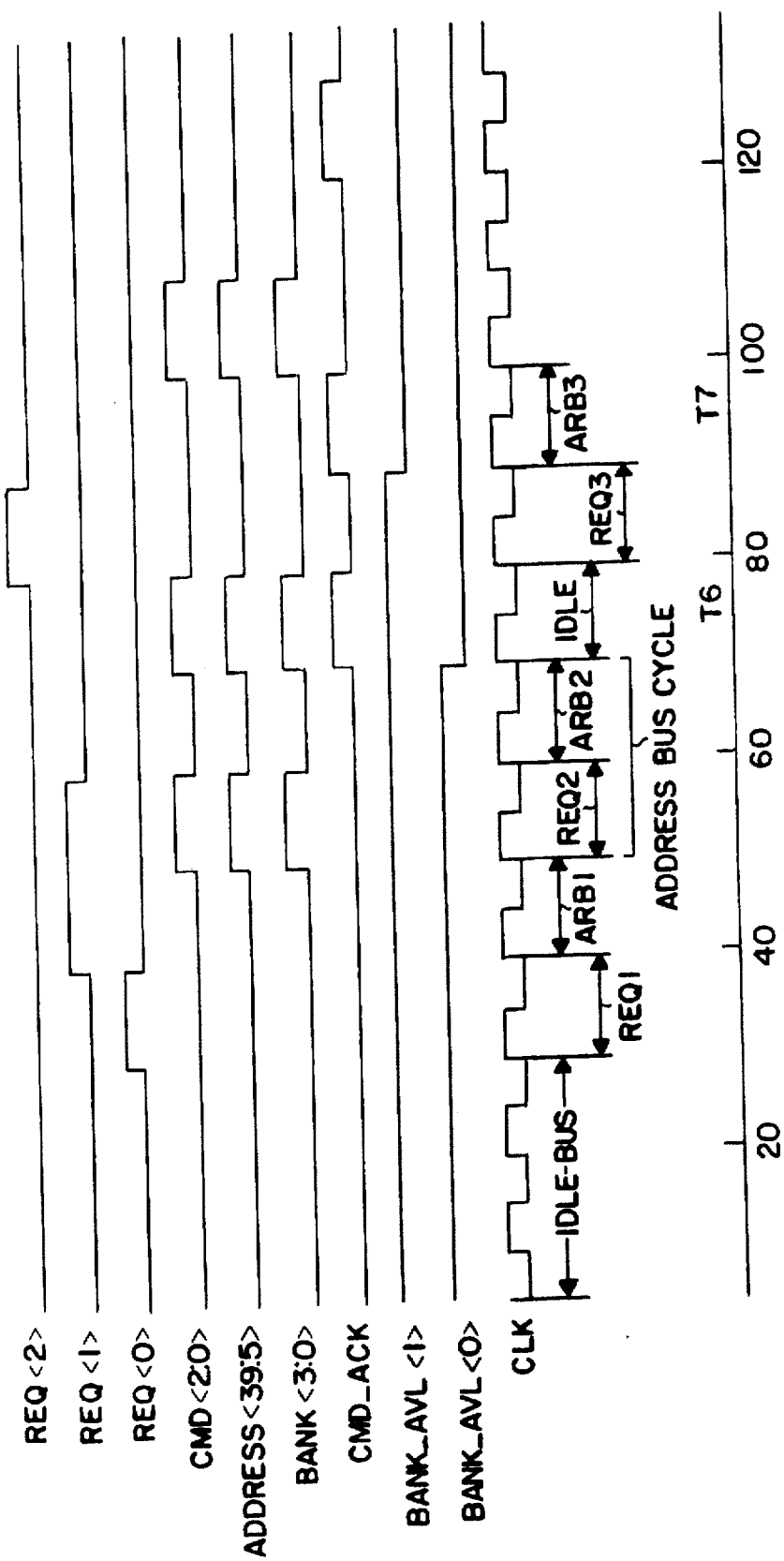
FIG. 4 is a timing diagram of various address bus transactions.

Referring now to FIG. 4, there is shown a timing diagram of address and command transactions on the address bus 44 according to the principles of the invention. The address bus 44 comprises the following signal lines: REQ8HI, REQ8LO, REQ<7:0>, ARB_SUP, CMD<2:0>, ADDRESS<39:5>, BANK<3:0>, CMD_ACK, BANK_AVL<15:0>, and CLK. The timing diagram of FIG. 4 shows representations of certain of these signals, demonstrating time slots for their respective assertions. REQ<2:0> are shown as indicative of the function of REQ8HI, REQ8LO, and REQ<7:0>; likewise, the BANK AVL<1:0> signals are representative of the function of the BANK_AVL <15:0> signals. The CMD signal represents a composite of the CMD<2:0> signals, the ADDRESS signal represents a composite of the ADDRESS<39:5> signals, and the BANK signal represents a composite of the BANK<3:0> signals.

The CLK signal is a synchronous system clock used for sequencing the address bus 44, the data bus 46, and all nodes connected to the system bus 12.

When a node desires to initiate an operation on the system bus 12, it acts as an address bus commander intiating an address and command transaction on the address bus 44. To initiate the address and command transaction, the node asserts one of the request lines REQ8HI, REQ8LO, and REQ<7:0> to request control of the address bus 44. Arbitration occurs amongst all the nodes requesting the address bus 44, resulting in a single address bus commander. According to the preferred embodiment, eight of the nine nodes that can be coupled to the address bus 44 each arbitrate for access to the address bus 44 via one of request lines REQ<7:0>. The ninth node, an I/O node such as I/O node 26, arbitrates for access to the address bus via either of the REQ8HI and REQ8LO lines. Arbitration priorities amongst the nodes coupled to the REQ<7:0> request lines varies as will be further described. The REQ8HI and REQ8LO request lines always represent the highest and lowest arbitration priorities respectively. Nodes described herein arbitrate for access to the address bus 44 via the REQ<7:0> signals, thus the REQ8HI and REQ8LO signals will not be further described.

The system bus 12 according to the preferred embodiment is capable of supporting up to seven memory nodes. The memory address space is accessed by a 40 bit address. The granularity of a memory access on the system bus 12 is a 64 byte cache block. Thus, the ADDRESS<38:6> signals address a memory block. (The ADDRESS<39> signal is used in the preferred embodiment to distinguish memory from I/O address space). The ADDRESS<5> signal is used to signal which 32 byte sub-block of the 64 byte block is to be returned first via the 256 bit data bus. The CMD<2:0> signals encode the type of address and command transaction the present address bus commander desires to initiate, which types will be enumerated later.

According to the preferred embodiment, the system bus 12 is capable of supporting up to 16 banks 80 of memory, with up to four banks 80 (FIG. 1) per memory node 18. The bank 80 targeted by a particular address bus commander is encoded on the four BANK<3:0> lines. Each memory bank 80 also has one of the 16 BANK_AVL<15:0> lines assigned to it. The number of the BANK_AVL bit, i.e. BANK_AVL<1>, corresponds to the bank number assigned to that bank 80. A de-asserted BANK_AVL bit indicates to a commander node that the respective memory bank 80 is in use; thus no requests (except write bank unlock—to be explained later) can be issued to it.

The CMD_ACK signal is asserted by an address bus responder in response to the receipt of valid address and command information corresponding to the address bus responder's address range or bank number(s) on the address bus 44.

Address bus sequencing is now described with reference to FIG. 4. An address bus cycle is the time occupied by two cycles of the CLK signal. During the first CLK clock cycle of an address bus cycle the ADDRESS<39:5>, BANK<3:0>, and CMD<2:0> address bus signals are driven by the commanding node. The second CLK clock cycle is used for a dead cycle; that is, a cycle in which no node drives any bus signal lines. This leads to a simpler electrical interface design and the lowest achievable clock cycle time. There are two types of address bus cycles: data transfer command cycles, and non-data transfer command cycles, both of which will be further described later.

A node may request the bus via its commander address bus interface 50 by asserting of one of the REQ<7:0> lines during any cycle (T1). The mechanism for granting the address bus 44 is pipelined. The request cycle is followed by an arbitration cycle (T2) and then by a cycle where the command, address, and bank number are driven onto the address bus 44 via the corresponding CMD, ADDRESS, and BANK signal lines (T3). A new command and address transaction can be driven in every second cycle of the CLK signal.

An idle cycle is one in which no request line REQ<7:0> is asserted and no arbitration is taking place. A request cycle is the first one in which one of the request lines REQ<7:0> is asserted (REQ1), and every second cycle after that in which a request line REQ<7:0> is asserted until the bus returns to an idle state (REQ2, REQ3). An arbitration cycle is defined as the cycle following a request cycle (ARB1–ARB3). The pipelined nature of the address bus 44 is apparent in that the second request cycle marked REQ2 overlaps the cycle in which the command, address, and bank number are driven on the bus by the node that asserted REQ<0> in the cycle marked REQ1.

To initiate an address and command transaction on the address bus 44, a commander address bus interface 50 on a node requests the address bus 44 via one of the REQ<7:0> lines and arbitrates for access to the bus with other requesting nodes. Only when it wins arbitration can the commander address bus interface 50 drive its command, address, and bank number onto the address bus 44 via the ADDRESS<39:5>, CMD<2:0>, and BANK<3:0> lines. The command, address, and bank number corresponding to the assertion of the REQ<0> signal are submitted to the address bus 44 during the CLK cycle marked REQ2.

Figure 5:
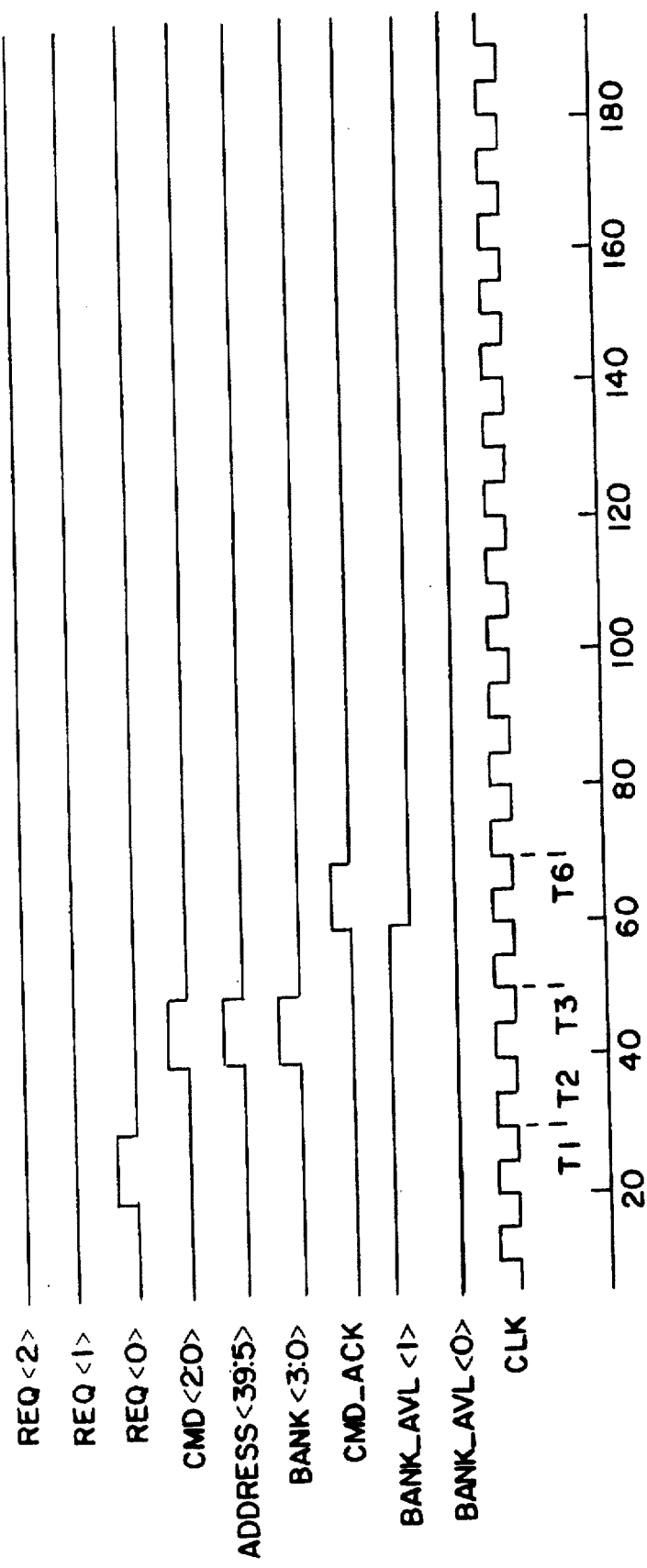
FIG. 5 is a timing diagram of a simple address bus transaction.

A simple address and command transaction on the address bus 44 is shown in FIG. 5. Here, the commander address bus interface 50 on the processor node 14 associated with the line REQ<0> requests the address bus 44, thus initiating a request cycle. In the following clock cycle all nodes arbitrate to determine which node will be given access to the address bus 44. During this arbitration cycle, since no other nodes are requesting the address bus 44, the processor node 14 is allowed access to the address bus 44 and becomes an address bus commander.

Two CLK clock cycles after it asserted the request, the commander address bus interface 50 on the processor node 14 drives the CMD<2:0>, ADDRESS<39:5>, and BANK<3:0> lines to initiate an address and command transaction to a memory bank 80 on one of the memory nodes, memory node 18 for instance, and deasserts the request REQ<0> line. Two CLK clock cycles later, the targeted memory node 18 containing the targeted memory bank 80 responds as an address bus responder by asserting the CMD_ACK signal via its responder address bus interface 52. The memory node 18 also de-asserts the BANK_AVL<0> line via its responder address bus interface 52 to indicate that memory bank 80 is now busy.

According to the preferred embodiment, when multiple nodes request control of the address bus 44 at the same time, a distributed arbitration mechanism determines which of the requesting nodes has highest priority, and grants that node control of the address bus 44. Accordingly, all nodes monitor the address bus 44. A requesting node watches the other request lines as it asserts its request line. Upon initialization, higher number request lines have higher priority; that is, the node asserting REQ<1> has priority over the node asserting REQ<0>. When a node wins the address bus 44 and issues an address and command transaction including data transfer command to the address bus 44, it becomes the lowest priority node. Any node whose priority was below that of the winning node has its priority incremented. Consequently, the priority of any node will eventually bubble up to the highest level. It should be realized that, though the preferred arbitration method is described, other types of arbitration may be advantageously employed; for example, a central arbitration scheme could alternately be used.

Figure 6:
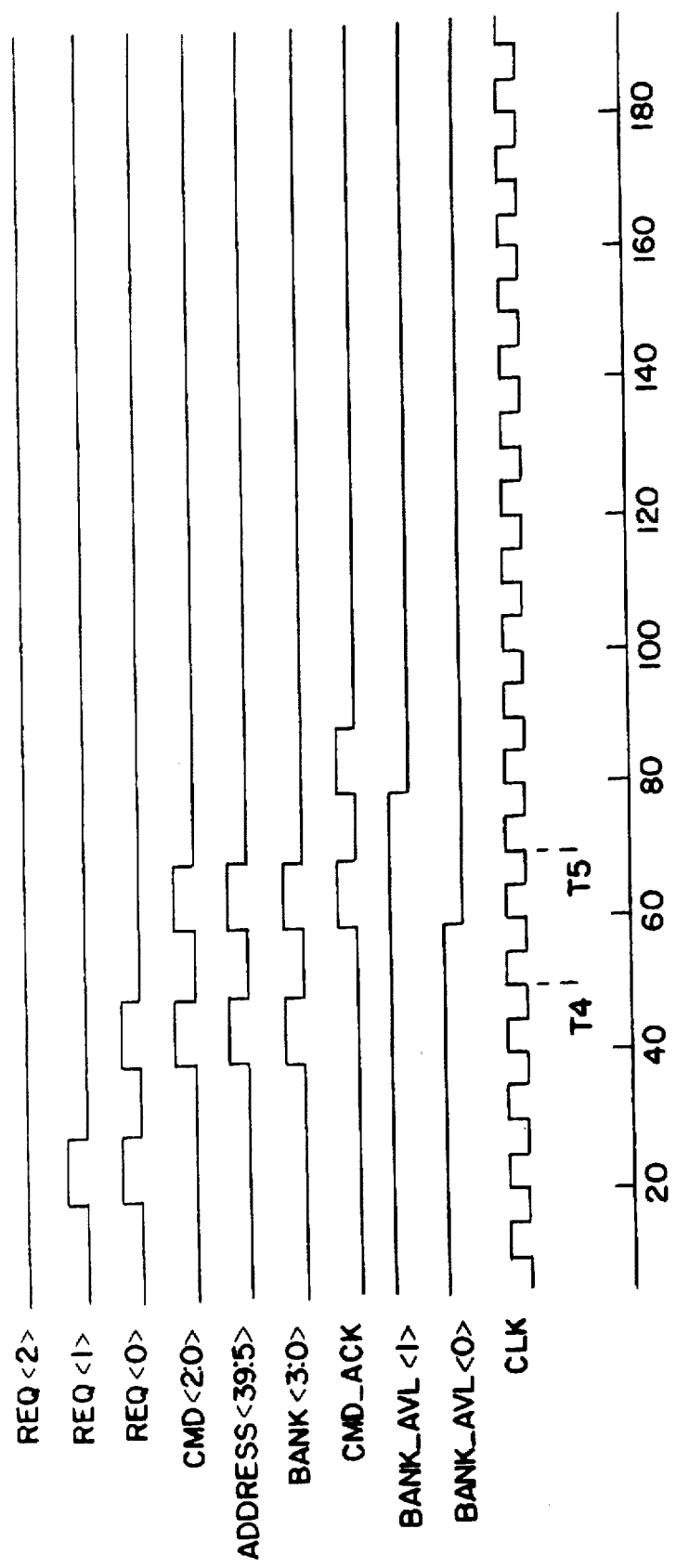
FIG. 6 is a timing diagram showing address bus arbitration.

Referring to FIG. 6, processor node 14 asserting the REQ<1> signal has the highest priority and wins the address bus 44 first. The first processor node 14 asserting REQ<1> drives the ADDRESS, CMD, and BANK lines in the cycle following the arb cycle, exactly two clock cycles after asserting its request line REQ<1> (T4). The second requesting processor node 16 continues to assert the REQ<0> line every other CLK cycle. It wins the address bus 44 during the arbitration cycle following the cycle in which the ADDRESS, CMD, and BANK lines were driven by the first processor node 14. The second processor node 16 then drives the ADDRESS, CMD, and BANK lines in the following cycle, two cycles after its request (T5). During this cycle, The CMD_ACK signal is asserted and the BANK_AVL<1> signal is de-asserted by an address bus responder in response to the address and command information asserted by the first processor node 14 in the previous cycle. Two cycles later, the CMD_ACK signal is asserted and the BANK_AVL<0> signal is de-asserted by an address bus responder in response to the address and command information asserted by the second processor node 16. Note that a new address, command, and bank number can be driven every two address bus cycles.

The type of system bus operation requested by a commander node is encoded on the CMD<2:0> lines. The following table lists the available types of address bus commands according to the preferred embodiment.

TABLE I

| Command | CMD<2:0> | Description |
| --- | --- | --- |
| NON-DATA TRANSFER COMMANDS | | |
| 1. NOP | 000 | Nulled command |
| 2. Non-Data Command | 111 | Register Action |
| DATA TRANSFER COMMANDS | | |
| 3. Victim | 001 | Victim eviction |
| 4. Read | 010 | Memory read |
| 5. Write | 011 | Memory write |
| 6. Read Bank Lock | 100 | Read memory bank, lock |
| 7. Write Bank Unlock | 101 | Write memory bank, unlock |

TABLE I-continued

| Command | CMD<2:0> | Description |
| --- | --- | --- |
| 8. CSR Read | 110 | Read CSR data |
| 9. CSR Write | 111 | Write CSR data |

Non-Data Transfer Commands:

1. The NOP command is a non-data transfer type of command. It is used when the node that won arbitration decides to null the command. No action is taken on the address bus 44, and priority is not updated. Though the ADDRESS<39:5> and BANK<3:0> signals may be driven, the CMD. signals are driven to zero. Therefore the command is not acknowledged by an address bus responder via the CMD_ACK signal. The NOP command is useful because it allows the overlap of bank decode and bank availability checking with address bus 44 arbitration, and if the requested bank proves to be unavailable, allows the requesting node to remove its command from the address bus 44. This results in a higher effective throughput between an address bus commander and the address bus 44.

Figure 7:
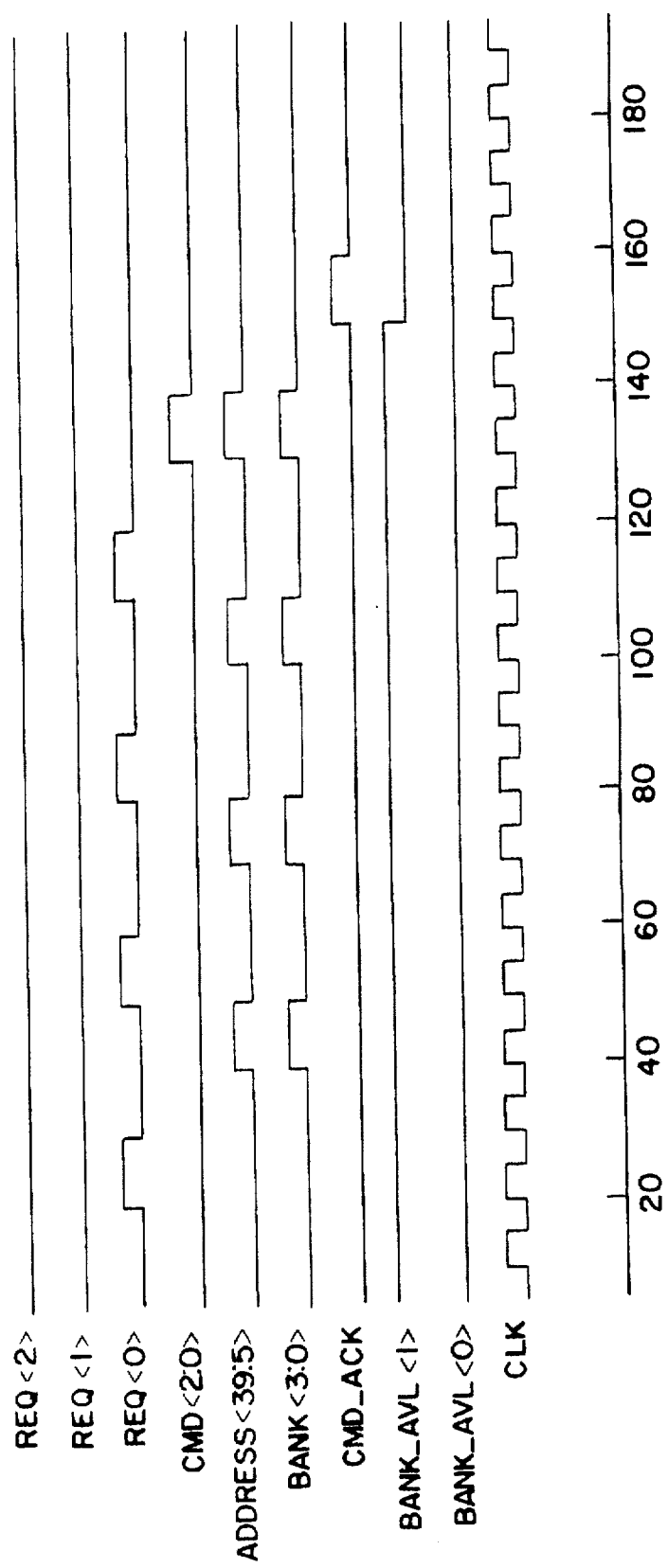
FIG. 7 is a timing diagram showing early address bus arbitration.

In FIG. 7 there is shown an example wherein a processor node 14 asserts the REQ<0> signal (T5) and then finds that it does not require a system bus operation. This is known as a "false" request. A NOP cycle follows (T6). Note that though address and bank information is driven via the ADDRESS and BANK lines, the CMD lines are driven to 0, and the CMD ACK signal is not asserted in response. In FIG. 7 the processor node 14 false requests several times, finally winning the address bus 44 for a real request. Through use of the NOP cycle a processor node 14 can overlap the process of requesting and winning the address bus 44 with the process of determining whether the address bus 44 is required. For instance, when a cache miss is determined, the address bus 44 may already have been requested and won, effectively shortening the time to complete the address and command transaction. The NOP cycle also allows overlap of bus arbitration with the process of bank decoding and bank availability checking, further increasing address bus 44 throughput.

2. The highly flexible nature of a system bus 12 which is separated into an address bus 44 and a separate and independent data bus 46 is taken advantage of by the use of the Non-Data command. The non-data command is another non-data transfer type command, and is used for initiating register actions on nodes to which it is directed through use of the address bus 44 only. CSR write commands directed to certain pre-determined addresses trigger the register action. For example, according to the preferred embodiment, a write command directed to a particular address of FF8E000640H (where 'H' denotes hexadecimal base) decrements the register at that address. Like NOP, there is no CMD_ACK response, and no data transaction follows. Thus, register actions occur in response to address and command transactions on the address bus 44 only. No data transaction on the data bus 46 need occur in order to complete the system bus operation, thereby saving valuable data bus 46 bandwidth.

DATA TRANSFER COMMANDS:

3. A "victim" occurs according to the cache coherency protocol previously described when a CPU read results in a cache read miss to a location which contains valid dirty data. Before the cache location can be loaded with new data, the valid "victim" data presently stored at that location must be written back to memory. The Victim command is used to write the block of memory specified by the ADDRESS and BANK lines into memory only. Non-memory nodes do not need to do cache coherency checks according to the preferred cache coherency protocol.

4. The Read command is used to indicate that an address bus responder should supply the memory block specified by the ADDRESS and BANK lines to the address bus commander via the data bus 46. Non-requesting processor nodes that implement caches must monitor the bus and provide the appropriate cache status to the data bus commander as will be later described.

5. The Write command is used to write the memory block specified by the ADDRESS and BANK lines. Any processor node whose primary or secondary cache contains the block with that address can update or invalidate the cache entry based on that processor node's update protocol.

6. The Read Bank Lock command is used by a node to read-modify-write an address in a memory bank 80. The read bank lock command reads a location in a memory bank 80 and then locks access to the memory bank 80 until a Write Bank Unlock command issues to the same location.

7. The Write Bank Unlock command is used by a node to complete a read modify write. It writes data to the location and unlocks the bank 80. The Read Bank Lock and Write Bank Unlock commands are used to ensure data coherency while accessing data blocks smaller than a 64 byte cache block.

8. The CSR Read command is used by a processor node to read a register from itself or from another node.

9. Likewise, the CSR Write command is used by a processor node to write to a register on its own node or on another node. Since cache coherency is not affected, no cache coherency status lines need be driven by the responder node in response to a CSR command. According to the preferred embodiment, one CSR command can be outstanding at any given time.

1.1 Processor Node Address Bus Interface

Figure 8:
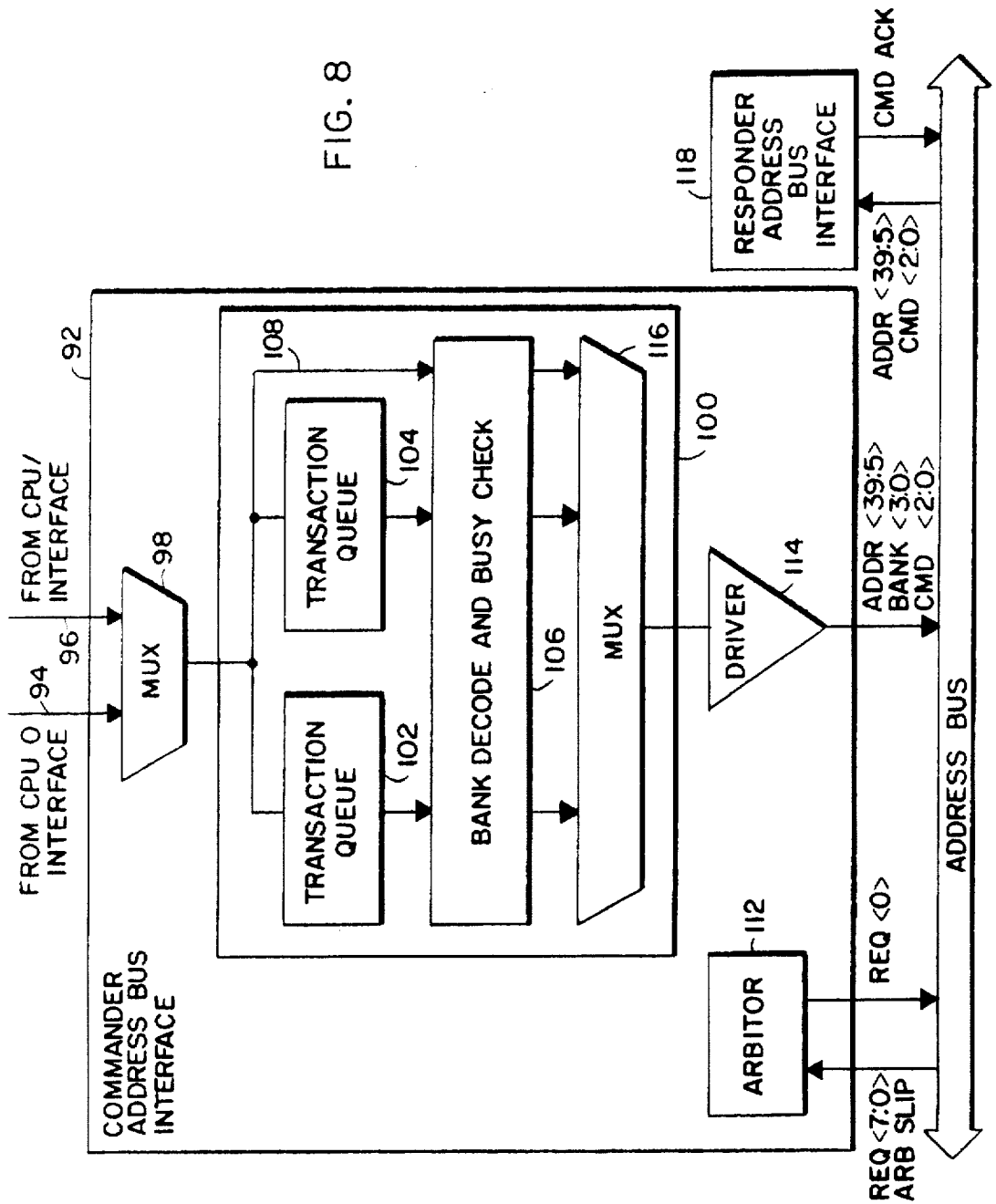
FIG. 8 is a block diagram of the processor address bus interface of FIG. 1.

The processor address bus interface 48 is now described for a processor node like processor node 14 with reference to FIGS. 3 and 8. Referring now to FIG. 3, the processor node 14 is shown to include two CPUs 68 and 70, having associated with them caches 72 and 74 respectively. The CPU 68 and cache 72 are coupled to a CPU0 interface 82, which is in turn coupled to the processor address bus interface 48. Likewise, the CPU 70 and cache 74 are coupled to a CPU1 interface 84, which is also coupled to the processor address bus interface 48. A bus queue 86 couples the processor address bus interface 48 to the processor data bus interface 56. The processor address bus interface 48 logically includes a commander address bus interface 50 and a responder address bus interface 52.

Processor Commander Address Bus Interface

The bus queue 86 keeps track of all outstanding address and command transactions on the address bus 44 for purposes of determining what actions, if any, are required by the processor node 14 in response to each address and command transaction. The bus queue 86 thus monitors the address bus 44 and stores address and command transactions intiated by the CPU0 interface 82, the CPU1 interface 84, and all other nodes they are submitted to the address bus 44. Bus queue entries 90 thus correspond to all outstanding address and command transactions in the order they are submitted to the address bus 44.

Referring to FIG. 8, when the CPU 68 requires access to memory data which is not present in its cache 72, address and command information is fed to the processor commander address bus interface 92 from the CPU0 interface 82 via lines 94 in order to initiate an address and command transaction on the address bus 44. Likewise, when the other CPU 70 requires access to data which is not present in its cache 74, address and command information is fed to the processor commander address bus interface 92 from the CPU1 interface 84 via lines 96 in order to initiate an address and command transaction on the address bus 44.

Figure 9:
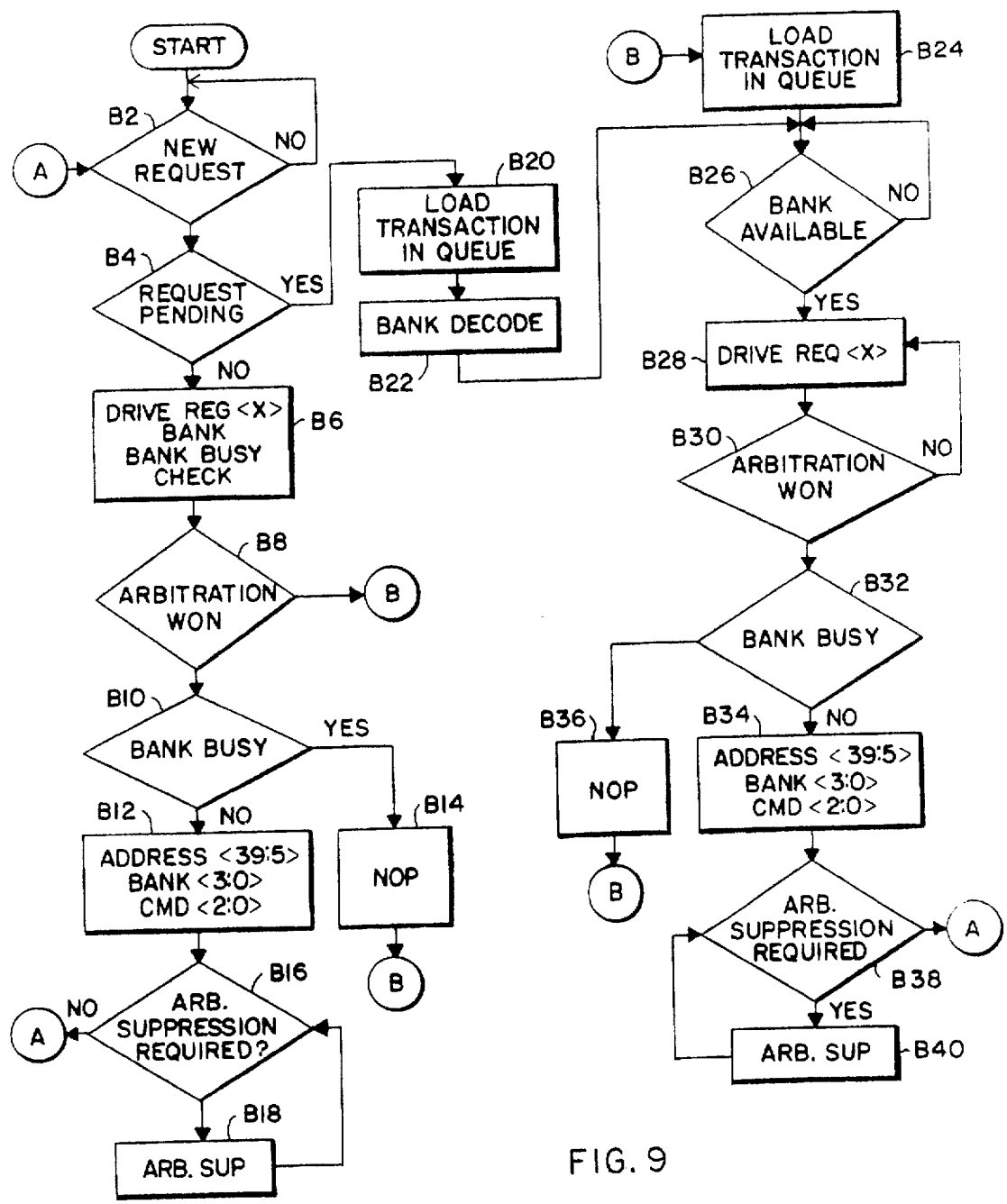
FIG. 9 is a flow diagram showing the operation of the processor commander address bus interface of FIG. 8.

The processor commander address bus interface 92 is described with reference to FIG. 8, the flow diagram of FIG. 9, and the timing diagram of FIG. 5. When either processor 68 or 70 requires use of the system bus 12 (B2), the information supplied on the lines 94 and 96 from the CPU0 interface 82 and the CPU1 interface 84 respectively is fed to a multiplexor 98 within the processor commander address bus interface 92. The multiplexor 98 selectively passes the address and command information from one of the two sources to an address bus interface circuit 100.

According to the particular implementation described, a CPU 68 or 70 may have up to three outstanding address and command transactions pending at any one time. The address bus interface circuit 100 therefore includes two transaction queues 102 and 104 in which outstanding address and command transactions can be stored. The transaction queues 102 and 104 each comprise three registers, so that the transaction queue 102 can store up to three outstanding address and command transactions from the CPU 68, while the transaction queue 104 can store up to three outstanding address and command transactions from the CPU 70. Address and command transactions initiated by the CPU 68 or CPU 70 are submitted to the address bus 44 in the order in which they were loaded into their respective queue 102 and 104 registers.

Each queue 102 and 104 feeds a bank decode and busy checking circuit 106. The bank decode and busy checking circuit 106 is also fed directly via a direct path 108 from the multiplexor 98 so as not to delay an address and command submission in the event that there are no queue entries in queues 102 or 104.

When a request is pending from either the CPU0 interface 82 or the CPU1 interface 84, and if there are presently no entries in the queues 102 or 104, the request is serviced via the direct path 108. Accordingly, an arbitor 112 requests control of the address bus 44 via assertion of one of the REQ<7:0> signals—in this case, REQ0 (FIG. 5 at T1, FIG. 9 at B6).

At the same time, the bank decode and busy checking circuit 106 decodes the address and command information on the direct path 108 to determine which memory bank is being requested, and monitors the BANK_AVL lines to determine whether the requested bank is available, while the arbitor 112 monitors the address bus 44 REQ<7:0> lines to determine whether arbitration has been won (BS). If arbitration has not been won, the address and command information on the direct path 108 is stored in the appropriate queue 102 or 104 (B24). If arbitration has been won, the CMD<2:0> and BANK<3:0> lines are checked to determine whether the requested bank 80 has recently become busy (B10). If the bank 80 is available, the address and command information is driven onto the address bus 44 ADDRESS <39:5>, CMD<2:0>, and BANK<3:0> lines via address bus drivers 114 (B12, T3). If the bank has become unavailable, however, a NOP cycle occurs and the address and command information on the direct path 108 is stored in the appropriate queue 102 or 104.

For address and command information which has been stored in one of the queues 102 or 104, either because the direct path 108 was in use (B24) or because an address and command transaction on the direct path 108 found a bank 80 unavailable or lost arbitration and was thus moved to one of the queues 102 or 104 (B20), the bank decode and busy checking circuit 106 monitors the BANK_AVL lines to determine whether the requested bank 80 is available (B26). If the bank 80 is available, the request line REQ<0> is driven (B28), and the arbitrator 112 checks to see if arbitration has been won (B30). If arbitration has not been won, REQ<0> will be re-asserted until arbitration is won. When arbitration is won, a final check of the CMD<2:0> and BANK<3:0> lines is made to ensure that the requested bank 80 has not recently become unavailable (B32). If the bank 80 is still available, the address and command information in the queue 102 entry is driven onto the address bus 44 ADDRESS<39:5>, CMD<2:0>, and BANK<3:0> lines via the address bus drivers 114 (B34). If the bank 80 has become unavailable, a NOP cycle occurs.

The multiplexor 116 selects between the two queues 102 and 104 and the direct path 108 to determine which will drive address and command information on the address bus 44. The various paths are usually selected on a first come first served basis. However, if, for example, a queue 102 entry from the CPU0 interface 82 is directed to a busy bank 80, a queue entry at the head of the queue 104 from the CPU1 interface 84 that is directed to an available bank 80 can proceed.

Processor Responder Address Bus Interface

A processor node such as processor node 14 can act as an address bus responder, for example, in the event that another node (or the processor node 14 itself) requests access to a CSR register resident on the processor node 14 via a CSR read or write command.

Figure 10:
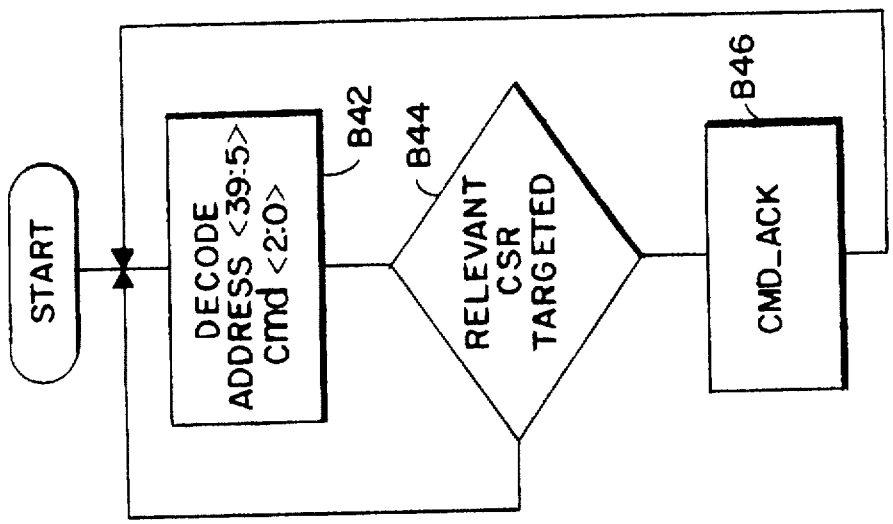
FIG. 10 is a flow diagram showing the operation of the processor responder address bus interface of FIG. 8.

In FIG. 3 the processor responder address bus interface 118 accepts as input the ADDR<39:5> and CMD<2:0> signals from the address bus 44, and provides the CMD_ACK signal to the address bus 44. Referring to the flow diagram of FIG. 10, when the processor responder address bus interface 118 within the processor address bus interface 48 of the processor node 14 determines from a decode of the ADDR and CMD signals (B42) that the address and command transaction presently occurring on the address bus 44 targets a CSR register for which the processor node 14 should respond (B44), the processor responder address bus interface 118 drives the CMD_ACK signal (B46), completing the address and command transaction on the address bus 44.

1.2 Address Bus Flow Control

Because the address bus 44 and the data bus 46 operate separately and independently, a slow-down on the data bus 46 will not affect the rate at which address and command transfers occur on the address bus 44. The ARB_SUP signal is therefore provided on the address bus 44 to control the rate at which address and command transfers occur on the address bus 44, while not affecting the rate at which data transfers occur on the data bus 46.

For a processor node such as processor node 14, module level resources can become burdened by outstanding system bus operations, warranting suppression of bus arbitration for a time. For instance, queues resident on the processor node 14 for updating cache status might become full, preventing the processor node 14 from accepting further information from the system bus 12 in order to avoid an overflow condition.

Figure 11:
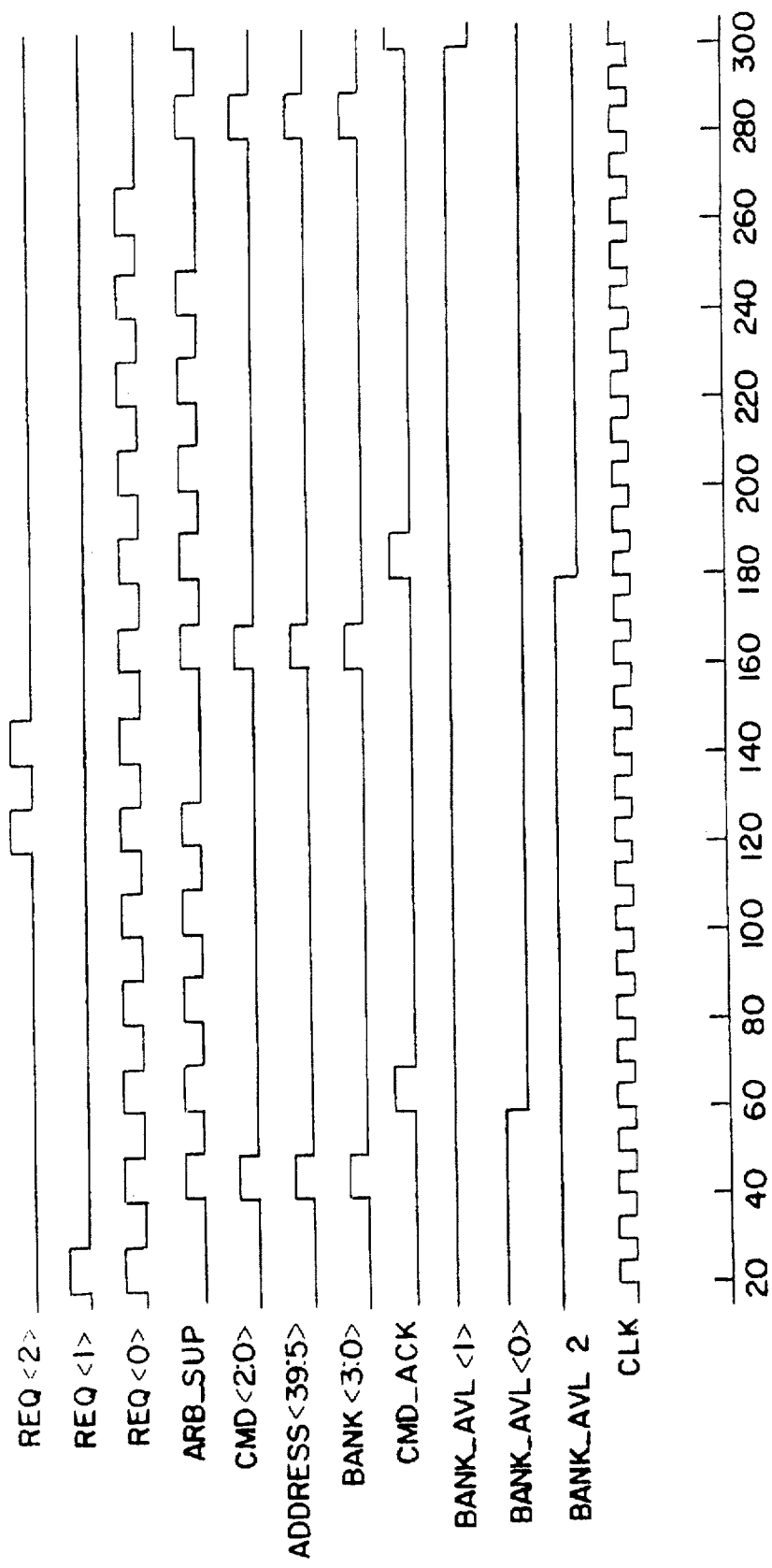
FIG. 11 is a timing diagram showing suppression of address bus arbitration via assertion of an address bus flow control signal.

FIG. 11 shows the use of the ARB_SUP signal by the processor node 14 address bus interface 48 to suppress address bus 40 arbitration when necessary. The ARB_SUP signal is asserted by the arbitor 112 (FIG. 8) in the cycle following an arbitration cycle; that is, in the cycle during which a command, address, and bank number are driven via the respective CMD, ADDRESS, and BANK signals. (See FIG. 9 B16) The ARB_SUP signal is asserted for one cycle and then deasserted for one cycle. This two cycle sequence is repeated until arbitration can be permitted again. Multiple nodes may assert ARB_SUP every two cycles. The cycle in which it is not asserted is the next request cycle if any device request signals are asserted at that time; otherwise it is an idle cycle.

Nodes may assert requests while the ARB_SUP signal is asserted, but no arbitration is allowed. Priority of nodes does not change while the ARB_SUP signal is inhibiting arbitration cycles.

Use of a flow control signal like ARB_SUP on an address bus which operates independently of a separate data bus has broad application. For instance, it might be desirable to suppress address bus arbitration in a system bus implementation where the memory nodes on the data bus cannot keep up with minimum data bus cycle times. The ARB_SUP signal can thus be used to tune the rate at which address and command information is fed to the address bus without affecting the rate at which data transfers occur on the data bus. In general, the address bus flow control signal ARB_SUP may be used any time it is desirable to affect the rate of transfers on the address bus without affecting the rate at which data transfers occur on the data bus.

1.3 Memory Node Address Bus Interface

Figure 12:
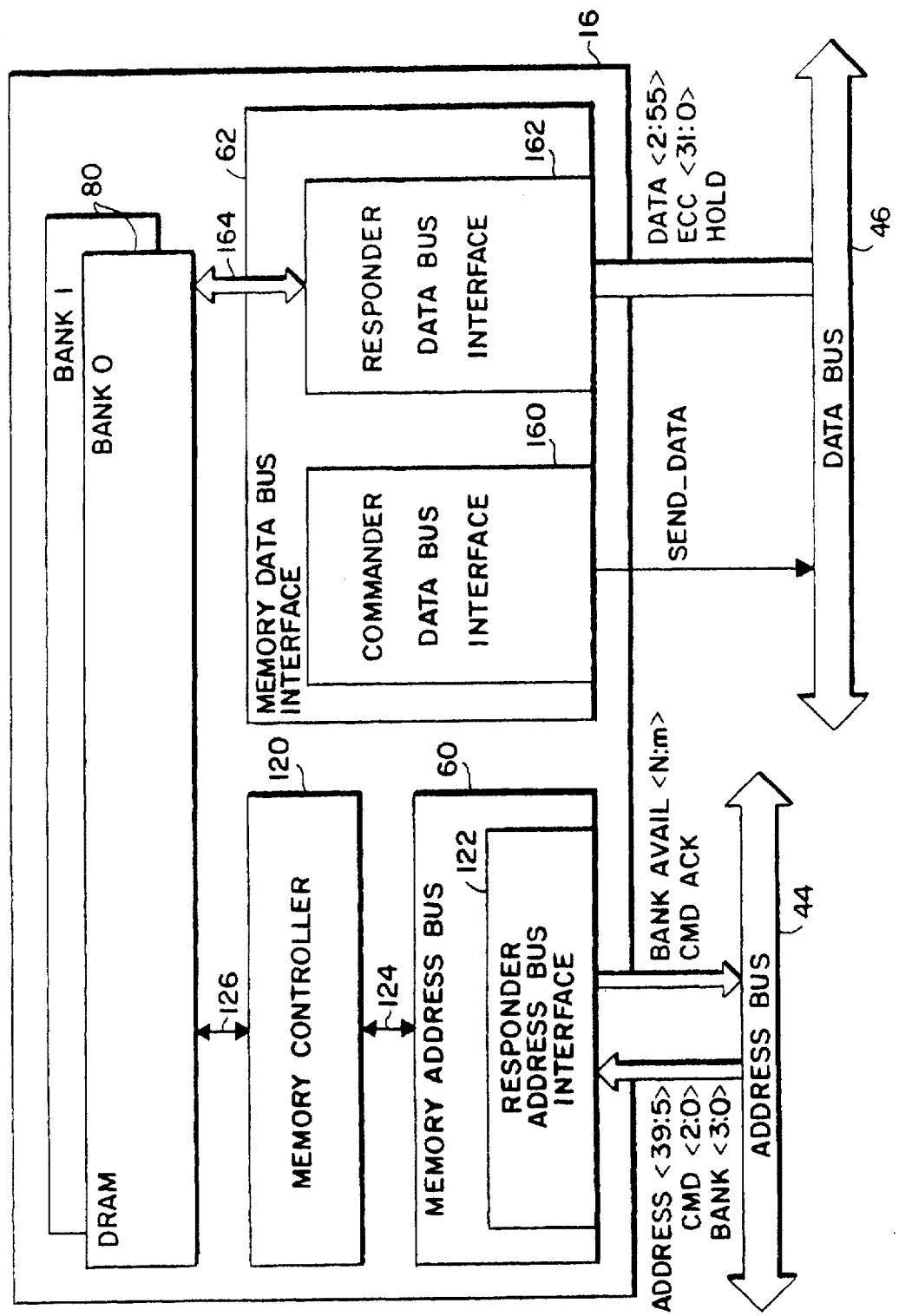
FIG. 12 is a block diagram of the memory system bus interface of FIG. 1.

Referring back to FIG. 1, memory nodes such as 18, 20, 22, and 24 act as address bus responders to memory read and write commands from address bus commanders—usually processor nodes such as 14 and 16. Referring now to FIG. 12 there is shown a block diagram of a memory node 18. The memory node 18 includes memory banks 80 coupled to a memory controller 120 which is in turn coupled to the memory address bus interface 60. Within the memory address bus interface 60 is a memory responder address bus interface circuit 122 which accepts address, bank, and command information from the address bus 44 via the ADDRESS<39:5>, CMD<2:0>, and BANK<3:0> signals. The memory responder address bus interface circuit 122 feeds the address, bank, and command information to a memory controller 120 via lines 124. The memory controller 120 converts the address and command information to memory address and control signals whose timing is suitable for use by the DRAM memory in memory banks 80 as is known in the art. The memory address and control signals are fed to the memory banks 80 via lines 126.

Figure 13:
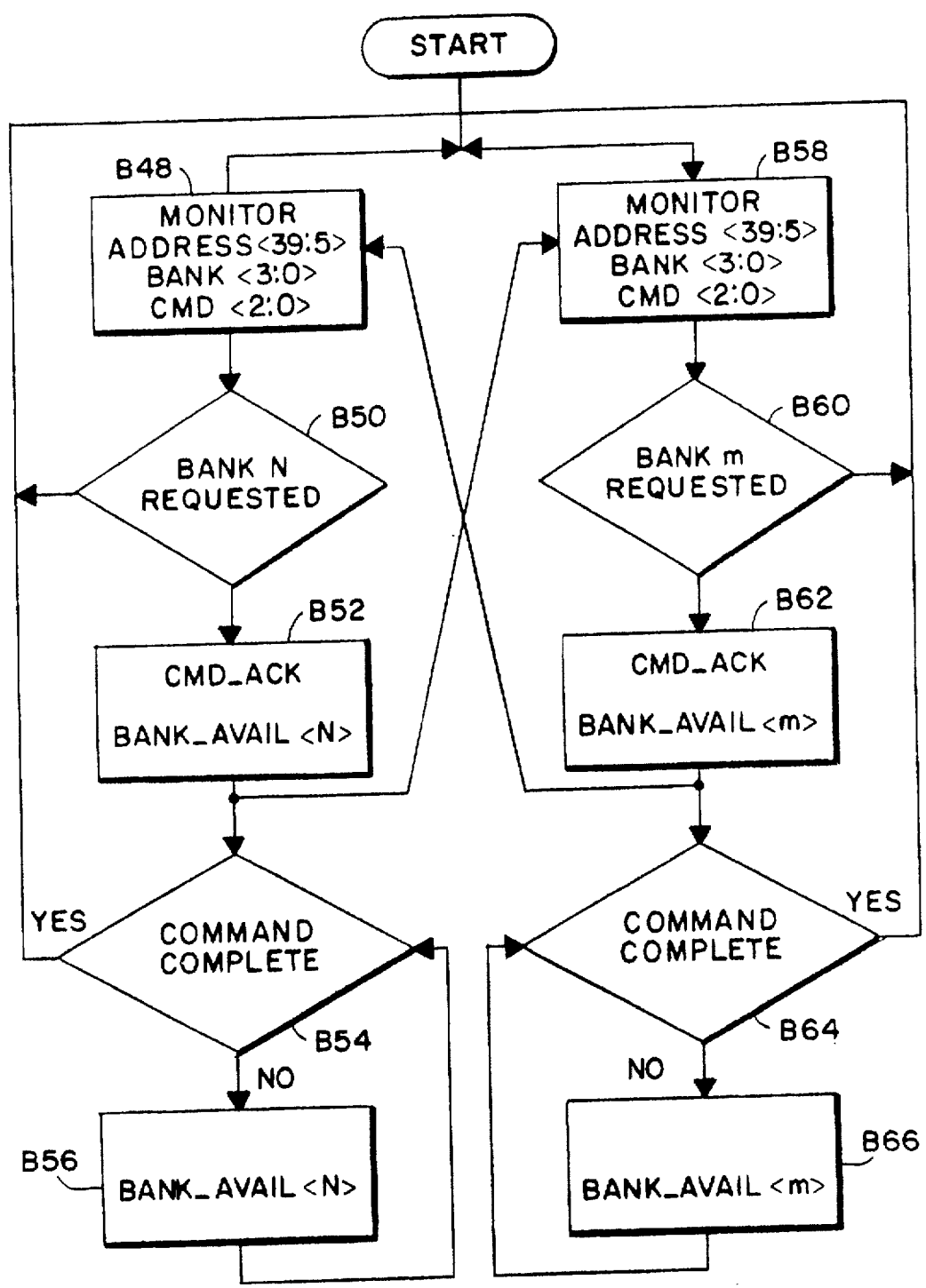
FIG. 13 is a flow diagram showing the operation of the memory responder address bus interface of FIG. 12.

A flow diagram of the memory responder address bus interface circuit 122 of the memory address bus interface 60 on a memory node 18 is shown in FIG. 13. Referring to FIGS. 12, 13, and 4, the memory responder address bus interface circuit 122 monitors the address bus 44 signals ADDRESS<39:5>, BANK<3:0>, and CMD<2:0> for addresses, bank numbers, and commands directed to the memory node 18 (B48). When an address, bank number, and command directed to either of the banks 80 on the memory node 18 is identified, for example a memory read request to bank 0 on the memory node 18, the memory responder address bus interface circuit 122 asserts the CMD_ACK signal two CLK cycles after the command information was asserted to acknowledge receipt of the command. The memory responder address bus interface circuit 122 also de-asserts the BANK_AVL<0> signal corresponding to the targeted bank (T6, B52) Meanwhile, the memory controller 120 provides from the address, bank, and command information on lines 126 memory address and control signals on lines 128 for use by the targeted memory bank 80. The memory responder address bus interface circuit 122 continues to de-assert the BANK_AVL<0> signal on the address bus 44 until the requested memory access has completed (B56).

While the memory access to bank 0 occurs, the memory responder address bus interface circuit 122 continues to monitor the ADDRESS, BANK, and CMD signals to determine whether an address and command transaction targets another bank on the memory node; for instance, bank 1 on memory node 18. If such an address and command transaction occurs, the memory responder address bus interface circuit 122 asserts the CMD_ACK signal two CLK cycles after the command information was asserted to acknowledge receipt of the command. The memory responder address bus interface circuit 122 also de-asserts the BANK_AVL<1> signal corresponding to the targeted bank 1 (B62, T7). Meanwhile, the memory controller 120 provides from the address, bank, and command information on lines 124 memory address and control signals on lines 126 for use by the targeted memory bank 1. The memory responder address bus interface circuit 122 continues to de-assert the BANK_AVL<1> signal on the address bus 44 until the requested memory access has completed.

1.4 I/O Node Address Bus Interface

Referring back to FIG. 1, I/O nodes such as I/O node 26 and I/O node 28 can act as address bus commanders which request CSR operations or memory operations via the read or read bank lock and write or write bank unlock commands. I/O nodes can also act as address bus responders in the event that an address bus commander requests data from a device coupled to the I/O node; for instance, when a processor node 14 requests data from a device on the Futurebus+ via the I/O node 26 (FIG. 1).

Figure 14:
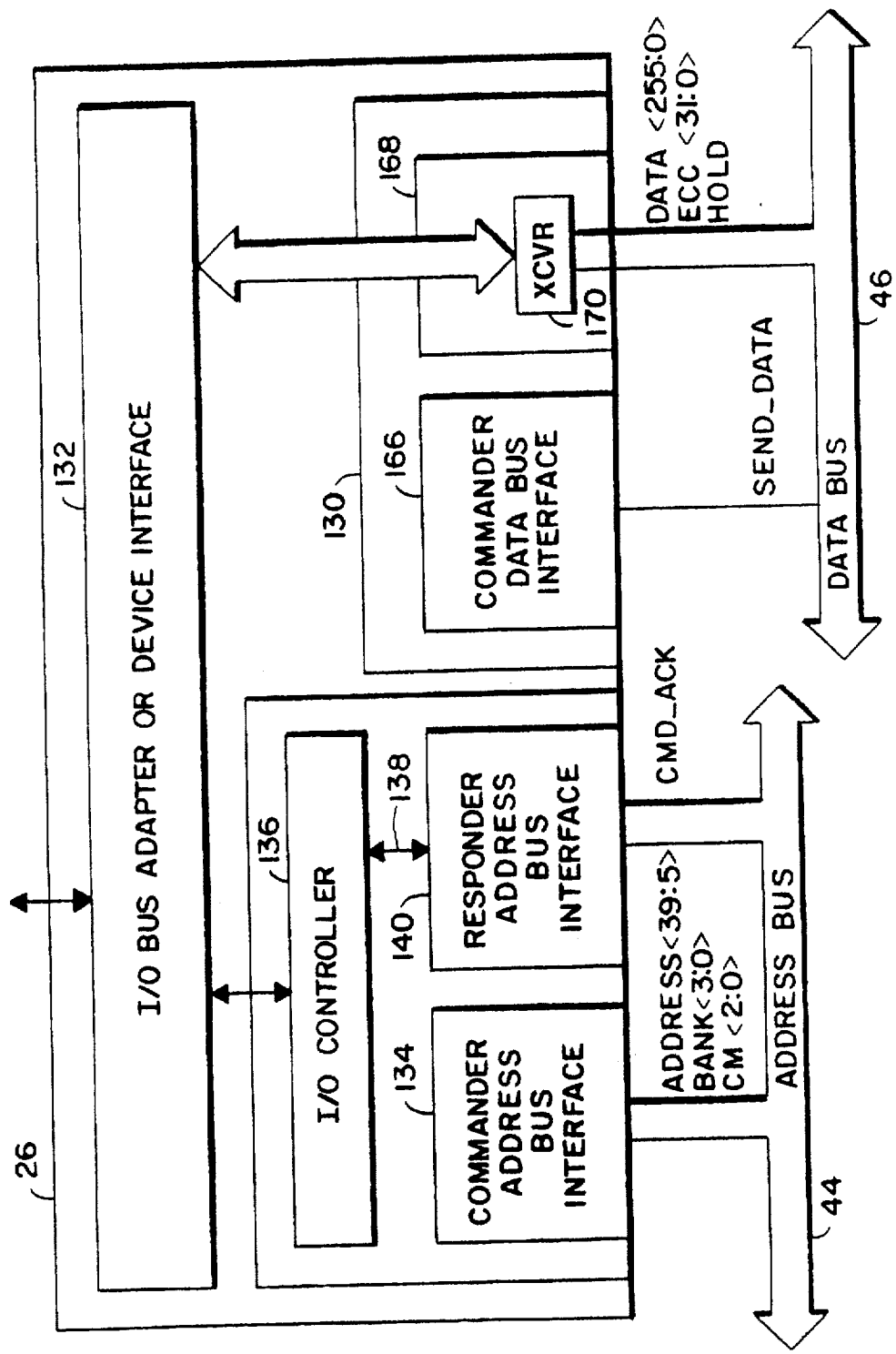
FIG. 14 is a block diagram of the I/O system bus interface of FIG. 1.

Referring now to FIG. 14 there is shown a block diagram of an I/O node 26 whose I/O system bus interface 34 includes an I/O address bus interface 64, an I/O data bus interface 130, and a device interface 132. The I/O address bus interface 64 further includes an I/O commander address bus interface circuit 134 and an I/O responder address bus interface circuit 135.

I/O Commander Address Bus Interface

An I/O node such as I/O node 26 (FIG. 1) may become an address bus commander for purposes of initiating a CSR read or CSR write to a processor node, or for initiating a read or read bank lock command to a memory node, or for initiating a write or a write bank unlock command to a memory node.

Figure 15B:
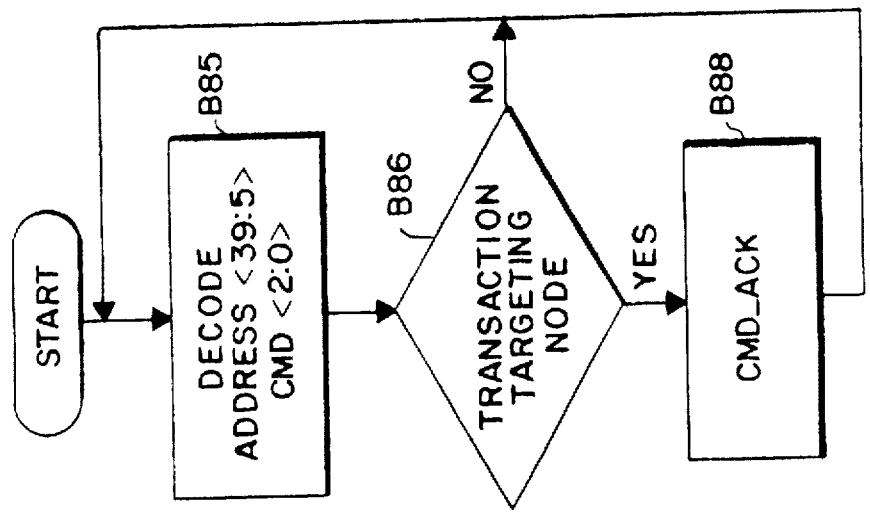
FIG. 15B is a flow diagram of the operation of the I/O responder address bus interface of FIG. 14.
Figure 15A:
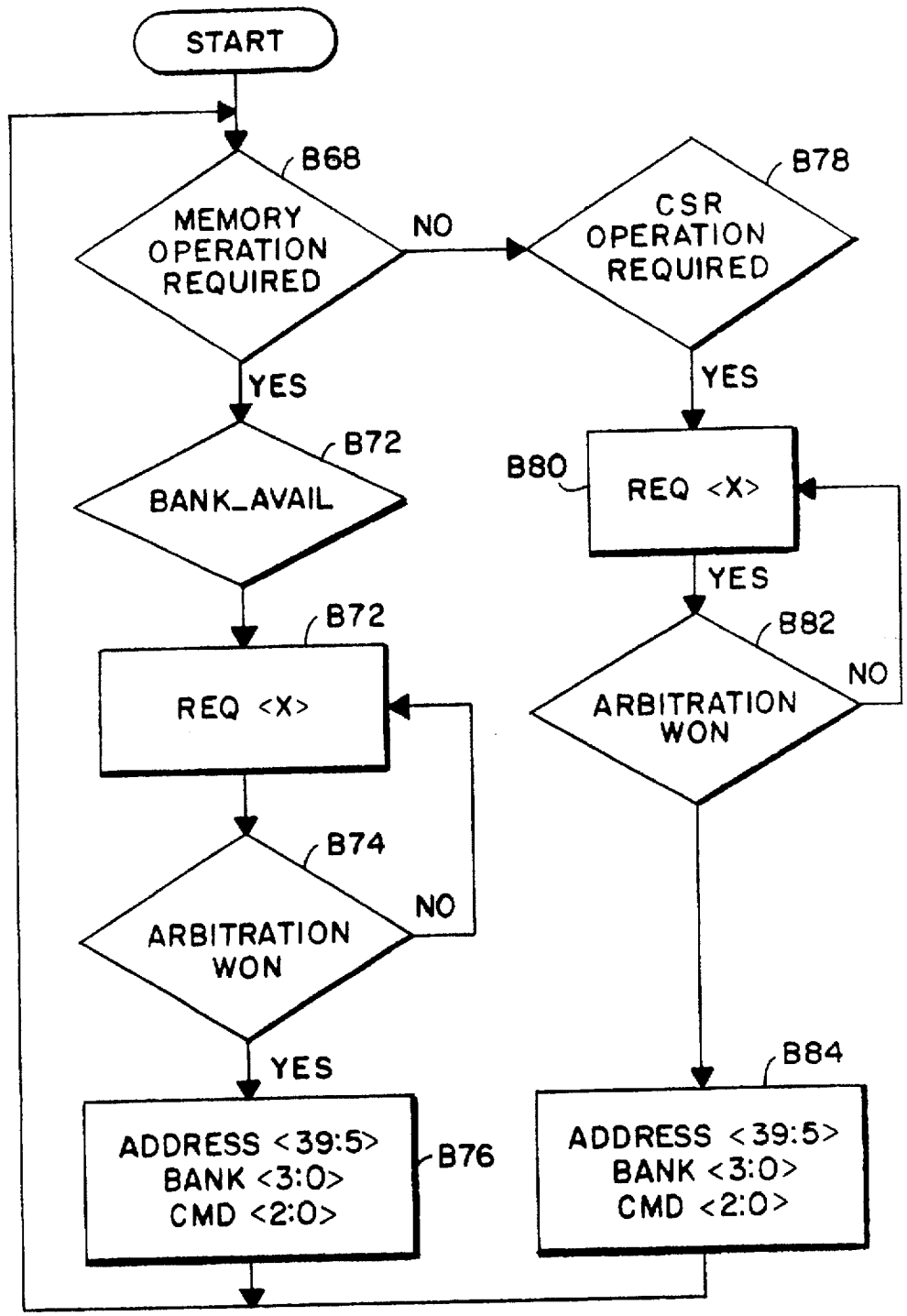
FIG. 15A is a flow diagram of the operation of the I/O commander address bus interface of FIG. 14.

A flow diagram of the I/O commander address bus interface circuit 134 of the I/O address bus interface 64 on the I/O node 26 is shown in FIG. 15. The I/O controller 136 feeds address and command information to the I/O commander address bus interface circuit 134 via lines 138 when a device or adapter desires to initiate either a memory or a CSR operation. If the I/O commander address bus interface circuit 134 is directed to initiate a memory operation other than a write bank unlock operation, it first checks the BANK_AVL signal on the address bus 44 corresponding to the memory bank 80 to be requested to determine whether the bank 80 is busy (B70). If the bank 80 is not busy, the I/O commander address bus interface circuit 134 asserts the appropriate REQ<7:0> signal on the address bus 44 (B72). For a write bank unlock operation no bank busy checking occurs, since the bank is busy by definition. When the I/O commander address bus interface circuit 134 determines that it has won bus arbitration (B74), the I/O commander address bus interface circuit 134 asserts the ADDRESS, CMD<2:0>, and BANK<3:0> signals in accordance with the read, read bank lock, write, write bank unlock, CSR read or CSR write command it is requesting (B76).

I/O Responder Address Bus Interface

The I/O address bus interface 64 also includes an I/O responder address bus interface circuit 135 (FIG. 14). The I/O responder address bus interface circuit 135 monitors the address bus 44 for address and command transactions initiated by other nodes and targeted to it (B86); for example, a CSR read of a register on the I/O node 26 by the processor node 14. When such an address and command transaction is recognized, the I/O responder address bus interface circuit 140 returns CMD_ACK to the requesting node (B88). The I/O responder address bus interface circuit 140 accepts address, bank, and command information from the address bus 44 via the ADDRESS<39:5>, CMD<2:0>, and BANK<3:0> signals, and feeds the address, bank, and command information to the I/O controller 136 via lines 138. The I/O controller 136 may convert the address and command information to I/O address and control signals to be used by the device interface 132 to access an I/O device or adapter.

2.0 DATA BUS

The data bus 46 is used by nodes to initiate data transactions and transfer data between nodes. Data transactions are initiated by a data bus commander, and completed by data bus responders. Data transactions occur on the data bus independently of address and command transactions on the address bus 44; thus, control of the data bus is separately arbitrated.

The data bus 46 is first functionally described with reference to the timing diagrams of FIGS. 16–18. The data bus interface circuitry for data bus commanders and data bus responders are then described.

Figure 16:
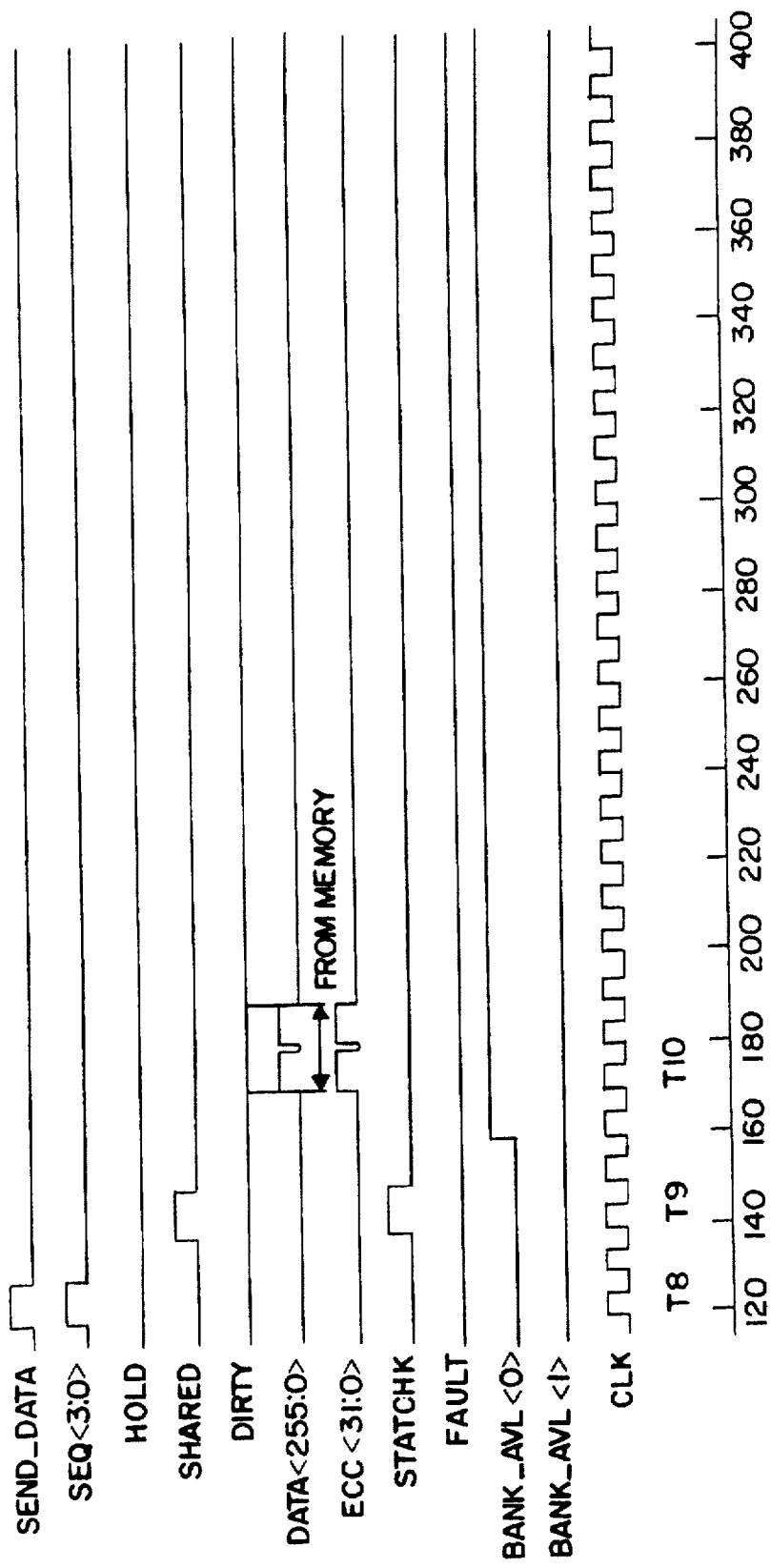
FIG. 16 is a timing diagram showing a data transaction on the data bus of FIG. 1.

In FIG. 16 there is shown a data transfer from memory to a processor node; for example, from a memory node 18 to a processor node 14 (FIG. 1), showing the timing of the various data bus 46 signals. The data bus 46 includes the following lines: SEND_DATA, SEQ<3:0>, HOLD, SHARED, DIRTY, DATA<255:0>, ECC<31:0>, and STATCHK. In FIG. 16 the signal SEQ is representative of the assertion time for the signals SEQ<3:0>, and the signal DATA is representative of the assertion time period for the DATA<255:0> and ECC<31:0> signals.

Data bus 142 timing is synchronous to the CLK signal. The SEND_DATA signal is used by a data bus commander to initiate a transfer on the data bus 46. The HOLD line is a flow control signal according to the principles of the invention to be further described later. DATA<255:0> is the 256 bit data bus. The ECC<31:0> signals are error detection and correction signals associated with the DATA lines. The SEQ<3:0> lines are part of the distributed bus sequencing method used to associate data transactions on the data bus 46 with address and command transactions on the address bus 44, and for data bus arbitration as will be further described later. The SHARED and DIRTY signals are driven on the data bus 46 by data bus responders to indicate the cache status of a requested block. The STATCHK signal is associated with error checking as will be further described.

For the basic data transaction for a memory read operation shown in FIG. 16, the data bus 46 operates generally as follows:

when a data bus commander wins data bus arbitration (to be described later), it drives the SEND_DATA signal (T8). Data bus responders respond with the shared and dirty status of the block via the SHARED and DIRTY lines (T9). The node on which the valid data block is resident then acts as a data bus responder for purposes of transferring the requested data (T10).

For example, for a memory read operation, the memory node 18 addressed by a previous address and command transaction on the address bus 44 acts as a data bus commander for purposes of initiating the data transaction. The processor nodes 14 and 16, acting as data bus responders in response to the initiation of the data transaction by the data bus commander, drive the SHARED and DIRTY signals to indicate the status of the requesting block in their respective caches. If the processor node 14 drives the DIRTY signal, indicating that the requested block is dirty in one of its caches, that processor node 14, as a data bus responder, drives the data to the bus three cycles later in response to the address and command transaction which initially requested it. If the DIRTY signal is not asserted by any of the processor nodes 14 or 16, the memory node 18 becomes a data bus responder node in order to drive the data from memory.

Figure 17:
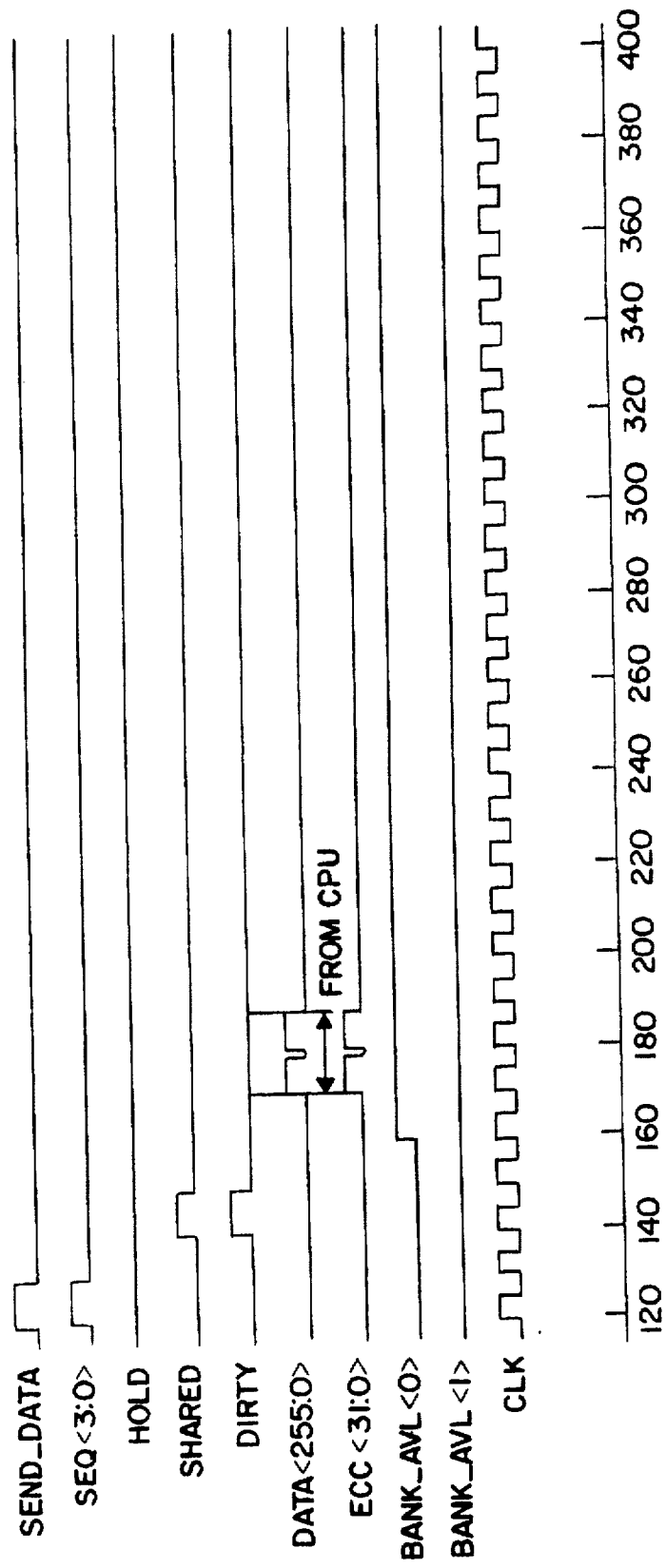
FIG. 17 is a timing diagram showing a data transaction transferring dirty data.

In FIG. 17 there is shown the data transaction portion of a memory read operation initiated by a processor node 14 including the return of dirty data from another processor node 16 according to the cache coherency mechanism. The data bus commander memory node 18 containing bank 0 asserts the SEND_DATA signal to initiate the data transaction on the data bus 46. The processor node 16 other than the processor node 14 that intiated the operation responds by asserting the SHARED and DIRTY signals. The memory node 18 interprets the DIRTY assertion as a signal that its data is not required, and does not drive the DATA lines. The processor node 16 asserting DIRTY drives the data lines three cycles later with the data in its cache. The cache protocol insures that at most one processor will drive DIRTY at a time.

Note that for the dual-CPU processor node 14 as shown in FIG. 3, the processor node can act as a data bus commander as a result of an address bus transaction initiated by an address and command transaction submitted to the address bus by the CPU 68, and then can act as a data bus responder to drive cache status from the CPU 70.

The SHARED and DIRTY signals are vulnerable to causing system errors because their values cannot be predicted and because no bus detected error will result if a node should receive a wrong value on one of these lines—however, data integrity may be compromised. The STATCHK signal is therefore provided as an error checking mechanism for these signals. STATCHK is asserted by a data bus responder whenever it is asserting SHARED or DIRTY. All nodes participating in the data transaction compare the assertion levels of SHARED and DIRTY to the assertion level of STATCHK. If a node finds SHARED or DIRTY asserted while STATCHK is deasserted, or finds STATCHK asserted while both SHARED and DIRTY are deasserted, a system fatal error is indicated.

Figure 18:
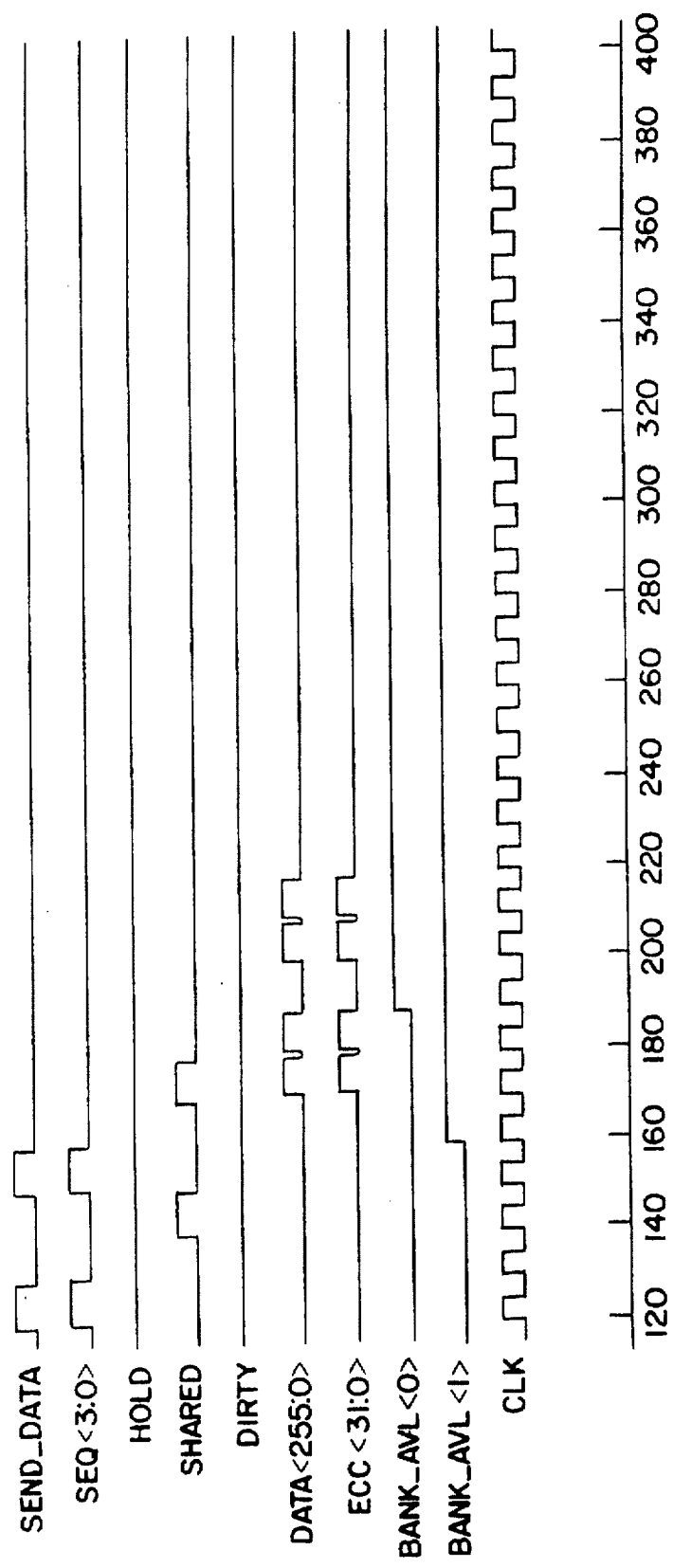
FIG. 18 is a timing diagram showing back-to-back data transactions on the data bus.

FIG. 18 shows two memory read operations being retired back to back. The memory node 18 containing memory bank 1 acts as the data bus commander for the first data transaction, asserting SEND_DATA. Processor nodes respond by driving their respective cache states of the requested block on the SHARED and DIRTY signals. Three cycles after the first SEND_DATA assertion, the second memory node 20, acting as a data bus commander, initiates a second data transaction to bank 0.

As can be seen, back-to-back data transactions can proceed every three CLK cycles. In general, a data bus cycle is the time occupied by three cycles of the CLK signal. During each of the first two CLK cycles the DATA bus signals are driven with 256 bits of data, resulting in a 512 bit total data transfer. The third CLK cycle is a tristate dead cycle, which leads to a simpler electrical interface design and the lowest achievable clock cycle time.

Comparatively, back-to-back address and command transactions on the address bus 40 can proceed every two cycles. In general, a system bus operating according to the principles of the invention will include an address bus 44 capable of completing the address and command transaction in N cycles, and a data bus 46 capable of completing the data transaction in M cycles. N and M may be the same, or N>M, or N<M.

In the preferred embodiment, M=N+1. Advantageous results are obtained by employing a separate address bus 44 and data bus 46 which operate in this manner. For instance, nodes can arbitrate for the address bus 44 before they know if a data transaction to memory is required. That is, they can arbitrate while they are determining their cache status according to the cache protocol, or during memory bank 80 decoding. If it turns out that no memory transaction is required, a NOP command can be submitted to the address bus 44. Since address and command transactions on the address bus 44 require fewer CLK cycles than are required to complete data transactions on the data bus 46, the non-data transfer NOP commands are essentially hidden in the extra bandwidth of the address bus 44.

2.1 Data Bus Sequencing

According to the principles of the invention, data transactions occur on the data bus 46 separately and independently of the occurrence of address and command transactions on the address bus 44; that is, the timing of data transactions and the rate at which data transactions are submitted to the data bus 46 is independent of the timing of address and command transactions and the rate at which address and command transactions are submitted to the address bus 44. Means are therefore provided for associating data transactions on the data bus 46 with address and command transactions on the address bus 44. Means are further provided by which nodes arbitrate for control of the data bus 46.

A distributed bus sequencing method is employed for these purposes. According to the preferred embodiment, the distributed bus sequencing method ensures that system bus operations are completed in the same order that they were issued. That is, data transactions occur on the data bus 46 in the same order as the address and command transactions with which the data transactions are associated occurred on the address bus 44. Accordingly, each address and command transaction is assigned a sequence number tag. Each node keeps track of the sequence of address and command transactions on the address bus 44 and data transactions on the data bus 46 to ensure that bus operations are completed in sequence number order.

In particular, referring back to FIG. 1, each of the processor nodes 14 and 16, each of the memory nodes 18, 20, 22, and 24, and each of the I/O nodes 26 and 28 coupled to the system bus 12 includes a data bus sequencer 144. For each node, the data bus sequencer 144 monitors the ADDRESS, CMD, and BANK lines on the address bus 44 to keep track of the number of outstanding address and command transactions on the address bus 44, and which of those transactions are pertinent to the node. Each processor, memory, and I/O node monitors the data bus 46 SEND DATA line to keep track of the number of data transactions that have occurred in order to determine when it should become a data bus commander.

Figure 19:
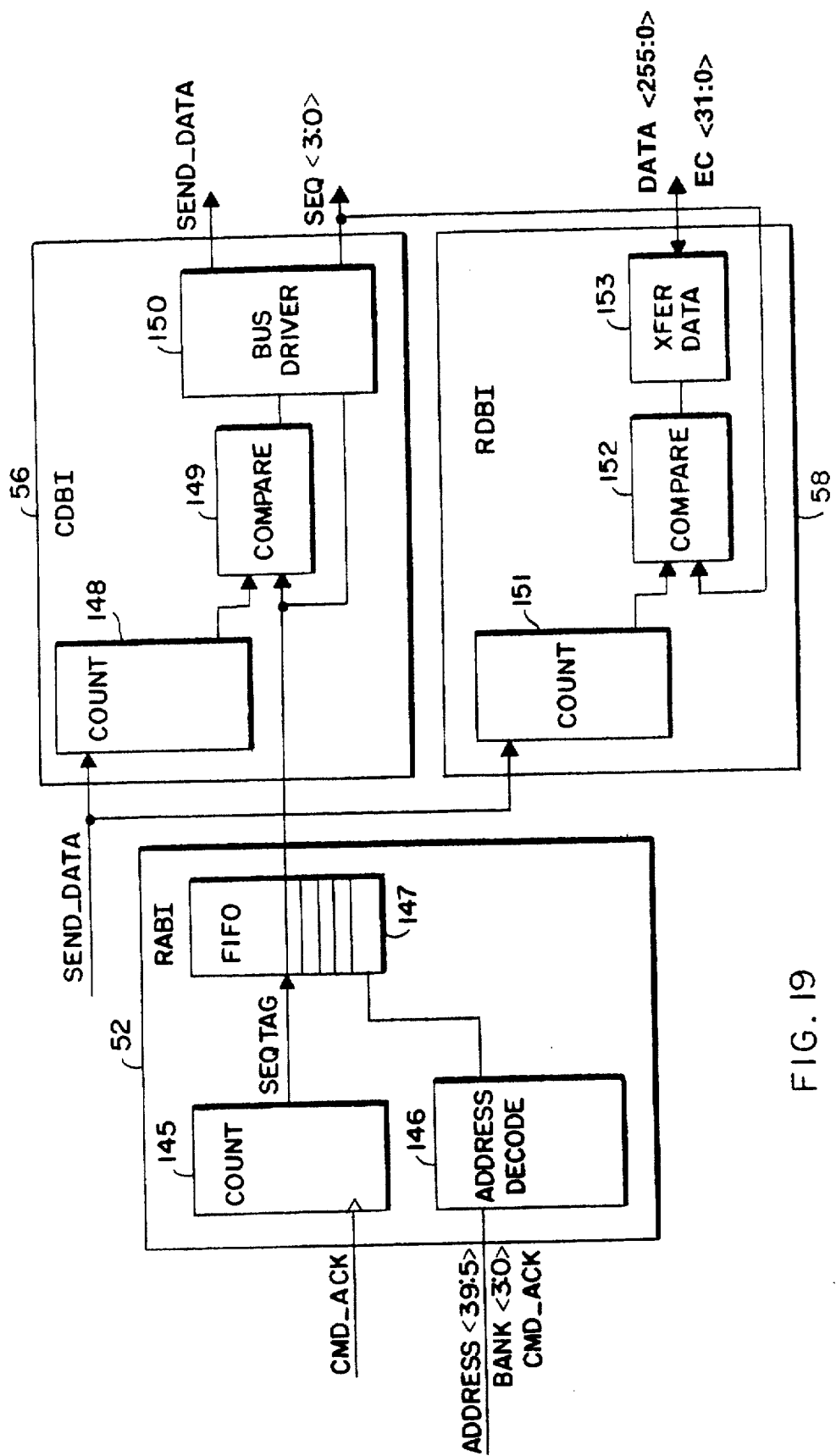
FIG. 19 is a block diagram of a data bus sequencer on a memory node.

Referring now to FIG. 19, the data bus sequencer 144 is shown in further detail as it operates for a typical memory read transaction initiated by a processor node 14. The data bus sequencer 144 as shown is employed on the memory nodes such as 18 and 20 and on the I/O nodes such as 26 and 28. The data bus sequencer 144 is distributed between the responder address bus interface 52, the commander data bus interface 56, and the responder data bus interface 58. Within the responder address bus interface 52 there is provided a four bit wrap-around address bus transaction counter 145 for counting sequence numbers from 0 to 15. The address bus transaction counter 145 and a decoder 146 feed a fifo 147. Within the commander data bus interface 56 there is provided a four bit wrap-around data bus transaction counter 148 for counting sequence numbers from 0 to 15. The data bus transaction counter 148 feeds a comparator 149, which feeds a bus driver 150. Upon a system reset, all counters initialize to a value '0'.

Consider for example a memory read transaction initiated by the processor node 14 to the memory node 18, followed by a memory read transaction initiated by the processor node 14 to the memory node 20. In order to initiate the first memory read transaction, the processor node 14, acting as an address bus commander, submits an address and command transaction to the address bus 44. The memory node 18, acting as an address bus responder, acknowledges receipt of the address and command by asserting an address bus signal CMD_ACK. The address bus transaction counters 146 within the responder address bus interfaces 52 on all nodes are thereby incremented, providing a sequence number tag of '1' corresponding to the address and command transaction acknowledged and indicating that there is now one outstanding address and command transaction on the address bus 44 for which a data transaction on the data bus 46 will eventually be generated. In addition, the decoder 146 in the responder address bus interface 52 on the memory node 18 recognizes the address and command transaction as targeting a bank 80 on the memory node 18, and therefore enables storage of the sequence number tag output from the counter 145 in the fifo 147 as a value from 0 to 15 upon the assertion of CMD_ACK. The fifo 147 therefore stores the value output by the counter 145 prior to the assertion of CMD_ACK—in this case, '0'. In general, the fifo 147 stores sequence tags of address and command transactions for which data transactions will be generated, thereby associating data transactions with address and command transactions.

Meanwhile, the processor node 14, again acting as an address bus commander, submits an address and command transaction on the address bus 44 in order to initiate the second memory read transaction. The memory node 20, acting as an address bus responder, acknowledges receipt of the address and command by asserting the address bus signal CMD_ACK. The address bus transaction counters 145 within the responder address bus interfaces 52 on all nodes are thereby incremented, indicating that there are now two outstanding address and command transactions on the address bus 44 for which a data transaction on the data bus 46 will eventually be generated. In addition, the decoder 146 in the address bus responder interface 52 on the memory node 20 recognizes the address and command transaction as targetting a bank 80 on the memory node 20, and therefore enables storage of the sequence number tag for the transaction, a value of '1', in its fifo 147.

Consider now that the memory node 18 is ready to respond to the first address and command transaction by initiating a data transaction and transferring data on the data bus 46. Before it becomes a data bus commander, the memory node 18 must arbitrate for the data bus 46. Accordingly, the sequence number tags stored in the fifo 147 within the responder address bus interface circuit 52 on the memory node 18 are forwarded to the commander data bus interface 56 on the memory node 18 in the order in which they were initially stored. In this case, a sequence number tag of '0' is passed to the commander data bus interface 56. The comparator 149 within the commander data bus interface 56 compares the sequence number tag to the output of the data bus transaction counter 148. In this case, the data bus transaction counter 148 is still in its reset state, outputting a value of '0'. The comparator 149 therefore indicates a match, and enables the bus driver 150. The memory node 18 in response becomes a data bus commander, initiating a data bus transaction by asserting the SEND_DATA signal on the data bus 46 via the bus driver 150.

The assertion of SEND_DATA increments the data bus transaction counters 148 within the commander data bus interfaces 58 on all nodes. Since the fifo 147 within the responder address bus interface 52 on the memory node 18 does not store '1' as an address and command transaction to which the memory node 18 should respond, the memory node 18 will not attempt to become the next data bus commander.

Before the data transaction related to the first memory read transaction occured on the data bus 46, the fifo 147 in the responder address bus interface 52 within the memory node 20 did not store '0' as a transaction to which it should respond; thus, there was no match in the comparator 149, and the memory node 20 did not attempt to become a data bus commander. However, as SEND_DATA was asserted by the memory node 18 in order to initiate the data transaction, the data bus transaction counters 148 in both commander data bus interfaces 56 were incremented. The fifo 147 within the responder address bus interface 52 on the memory node 20 previously stored '1' as the sequence number of a transaction for which it should become a data commander. Thus, there is now a match detected by the comparator 149, and the memory node 20 initiates a data transaction on the data bus 46 for the second memory read transaction via the assertion of SEND_DATA. This process repeats for further system bus operations, the counters wrapping back to '0' after the sixteenth operation has completed.

According to the particular implementation shown, the I/O nodes 26 and 28 employ similar data bus sequencers 144. The processor nodes 14 and 16 may implement similar means for tracking address and command transactions, associating data transactions with address and command transactions, and arbitrating for the data bus 46; however, according to the preferred embodiment of the processor nodes, the means employed to perform these functions on the memory and I/O nodes are not necessary on the processor nodes. Referring back to FIG. 3, each of the processor nodes 14 and 16 includes a bus queue 86. For each processor node, every address and command transaction that occurs on the address bus 44 has associated with it a queue entry 90 within the bus queue 86. As address and command transactions occur on the address bus 44, queue entries 90 related to the transactions are stored. As data transactions occur, the queue entries 90 are retired in the order that they were stored. Since the processor nodes respond to every system bus operation that occurs by at least storing an entry 90 in the bus queue 86, no separate counting logic is required to keep track of outstanding address and command transactions. When an entry at the head of the bus queue 86 indicates that the processor node should respond by initiating a data transaction on the data bus 46, it is necessarily the processor node's turn to respond—thus, no separate arbitration logic is required either.

According to a further aspect of the distributed bus sequencing method, a consistency checking method is provided by which nodes can check to see that data transactions are occuring on the data bus 46 in the proper order. Accordingly, data bus commanders provide the sequence number of the transaction on the data bus SEQ<3:0> signals (See FIG. 16). Data bus responders count the number of data transactions that have occured and compare that count to the sequence number indicated by the state of the SEQ<3:0> signals. When the count does not match the sequence number indicated on SEQ<3:0>, an error condition is indicated.

For example, referring back to FIG. 19, within the responder data bus interface 58 there is provided a four bit wrap-around consistency check counter 151 for counting sequence numbers from 0 to 15, and a consistency check comparator 152. The comparator 152 enables a data transfer circuit 153 for driving data on the data bus 46.

Whenever the comparator 149 within the commander data bus interface 56 indicates that the commander data bus interface 56 should initiate a data transaction on the data bus 46, the output of the fifo 147 is driven onto the SEQ<3:0> lines via the bus driver 150 as SEND_DATA is driven. Meanwhile, the consistency check counter 151 counts SEND_DATA assertions to track the number of data transactions occuring on the data bus 46. The counter output is compared via the comparator 152 with the sequence number indicated by the SEQ<3:0> signals at the time SEND_DATA is asserted. If the output of the counter 151 matches the sequence number on SEQ<3:0>, the data bus commander is responding properly to an outstanding address and command transaction. However, if the output of the counter 151 does not match the sequence number on SEQ<3:0>, an out-of-sequence error has occured.

Similar consistency checking circuitry is employed with the responder data bus interface 58 on each processor node (FIG. 3). In addition, the output of the counter 151 is forwarded to the commander data bus interface 56 on each processor node, which uses the counter output to generate the SEQ<3:0> signals when appropriate.

Any or all nodes employing consistency check circuitry assert a FAULT signal (FIG. 16) on the system bus 12 in response to the out-of-sequence error. Assertion of the FAULT signal indicates to all nodes coupled to the system bus 12 that (among other things) an out-of-sequence error has occurred. In response to the assertion of the fault signal, all sequence counters, including the address bus transaction counters 145 and the data bus transaction counters 148 within the data bus sequencers 144, are reset to a value of '0'. Outstanding transaction queues such as the processor node bus queue 86 are cleared, and arbitration circuits are reset.

The assertion of the FAULT signal and the subsequent resetting of the transaction counters is particularly useful for error recovery. It is typical in known systems to reset entire modules as a result of a bus error, including all registers on the modules. Any information stored which might be relevant to tracking the cause of the error is thus wiped out. According to the present invention, however, assertion of the FAULT signal resets the bus transaction counters and transaction queues and arbitration circuits, while leaving other module registers unaffected. Bus operations can therefore be re-started from a sequence number of '0' and registers examined to determine the cause of the out-of-sequence error.

It is understood that though the preferred embodiment retires operations in the order in which they were issued, alternate embodiments could choose to retire operations out of order. For example, if there are two outstanding address and command transactions pending on the address bus, a data transaction related to the second outstanding address and command transaction might be initiated prior to the data transaction related to the first outstanding address and command transaction. Accordingly, an extension of the previously described data bus sequencing method having further complexity of bus interface logic could employ the data bus sequence numbers SEQ<3:0> as data transaction tags in order to allow data transactions to occur out of order.

It is also understood that the previously described data bus sequencing method can be applied to more conventional system bus architectures wherein transactions occur on a single bus. Such transactions include address and command portions followed by data portions. Data portions of transactions can be initiated in response to address and command portions of transactions in an order directed by a data bus sequencing method similar to that described.

2.2 Data bus flow control

Because the address bus 44 and the data bus 46 operate separately and independently, use of the ARB_SUP flow control signal on the address bus 44 does not directly affect the rate at which data transfers occur on the data bus 46. The HOLD signal is therefore provided on the data bus 46 to control the rate at which data transfers occur on the data bus 46.

Figure 20:
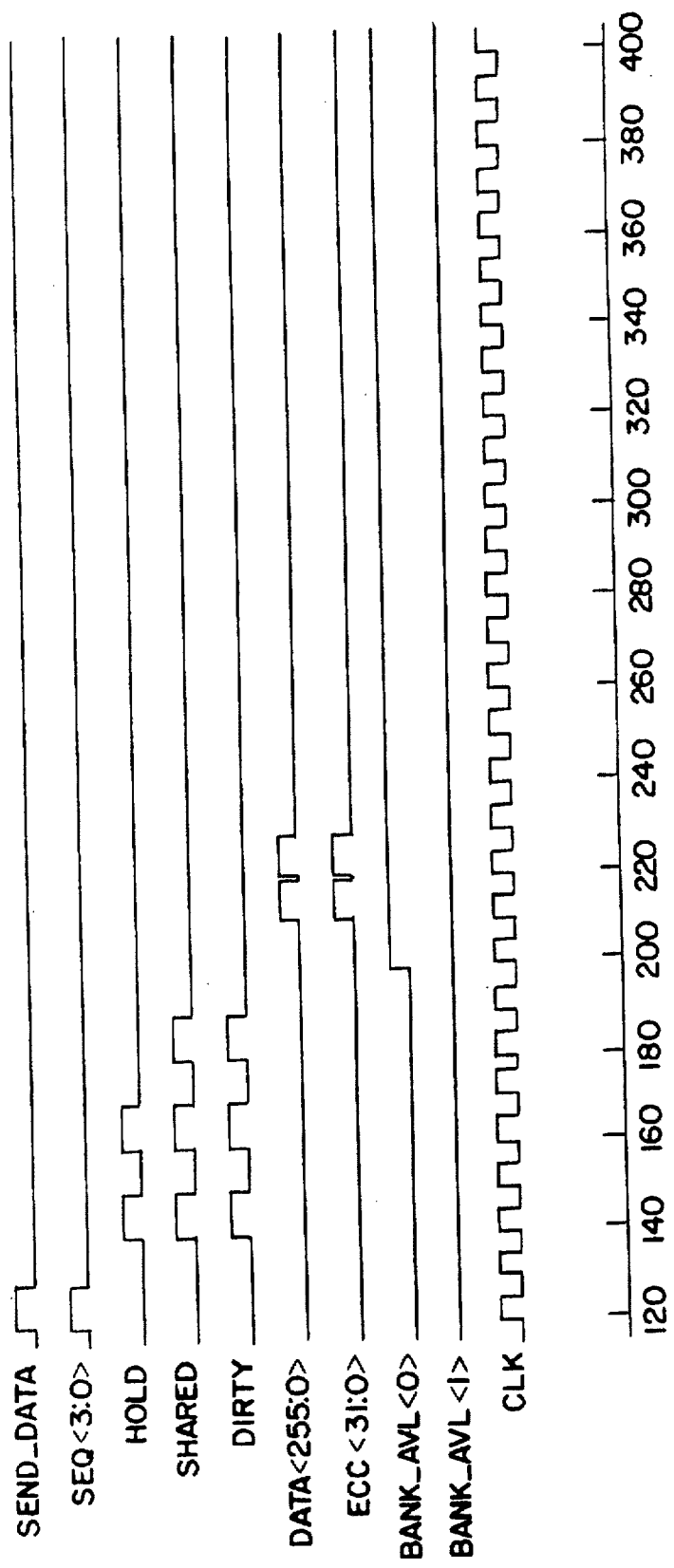
FIG. 20 is a timing diagram showing assertion of a data bus flow control signal.

FIG. 20 shows the function of the flow-control signal HOLD. In the Figure, a processor node 14, acting as a data bus responder, is not ready to respond to the assertion of SEND_DATA by the data bus commander memory node 18 containing memory bank 0, either because it does not yet know the SHARED and DIRTY state of the block in its cache, or because the appropriate data buffers are not available to receive or send the data. The node therefore drives the HOLD signal to stall the data transaction. The HOLD signal is asserted for one cycle and then deasserted for one cycle. This two cycle sequence may be repeated until the processor node 14 is ready to proceed with the data transaction. Multiple nodes may assert HOLD the first time, and the same or fewer nodes may assert it every second cycle thereafter until finally it is no longer asserted. The cycle in which it becomes deasserted is called the NO_HOLD cycle. During the NO HOLD cycle the SHARED and DIRTY signals are valid. Data is driven three cycles later.

Figure 21:
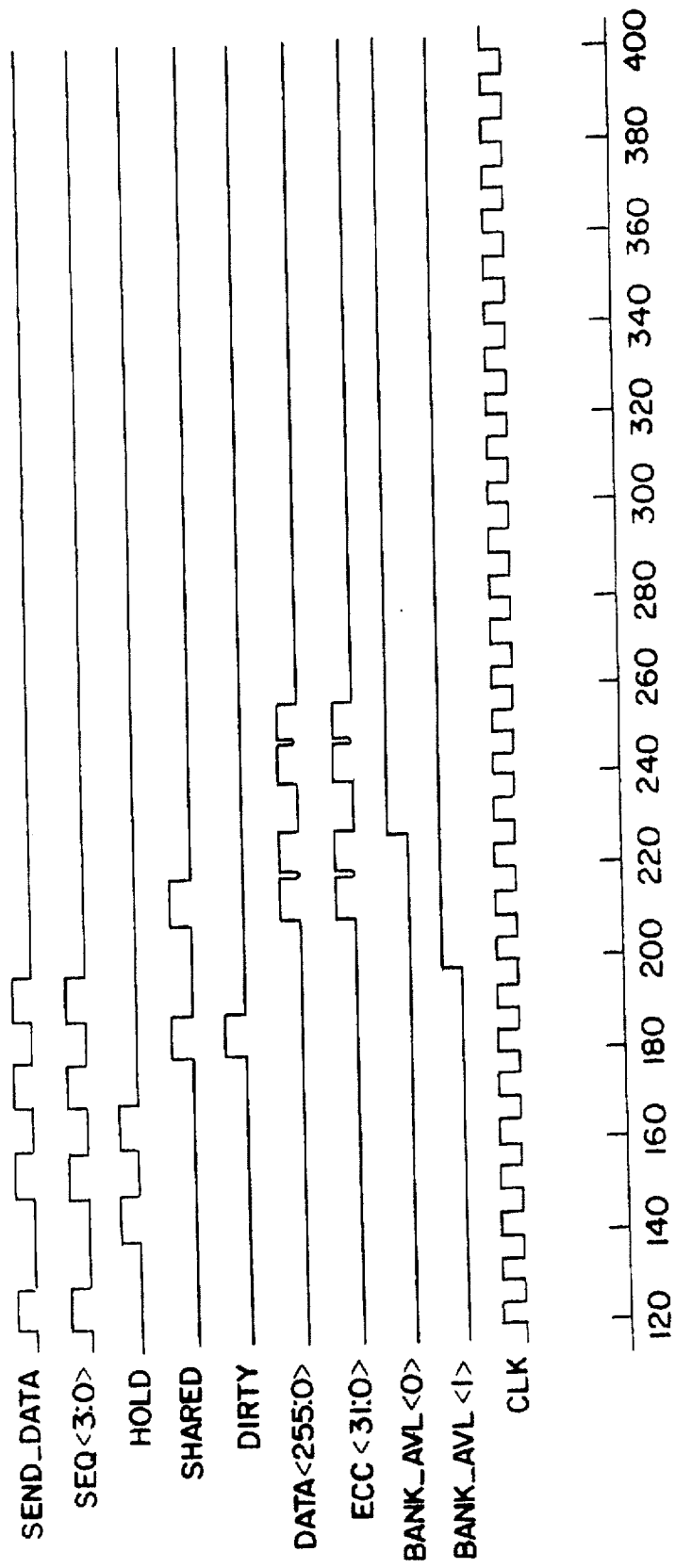
FIG. 21 is a timing diagram showing back-to-back data transactions during which the data bus flow control signal is asserted.

Nodes not driving HOLD and asserting SHARED or DIRTY continue to reassert the SHARED and DIRTY signals every two cycles through the NO_HOLD cycle. FIG. 21 shows back-to-back data returns with a HOLD assertion. HOLD is asserted in response to the first SEND_DATA assertion. The timing of the HOLD assertion is such that there is no time to prevent the second SEND_DATA assertion. The second node keeps asserting SEND_DATA through the NO_HOLD cycle. SEND_DATA is therefore ignored in any two cycle period in which HOLD is asserted, and in the no-hold cycle.

The data bus interface circuitry is now described for a memory node 18 acting as a data bus commander, the memory node 18 acting as a data bus responder, a processor node 14 acting as a data bus commander and as a data bus responder in accordance with the cache coherency protocol, and an I/O node 26 acting as a data bus commander and as a data bus responder.

2.3 Memory Data Bus Interface

Memory nodes such as memory node 18 typically act as data bus commanders as a result of an address and command transaction on the address bus initiated, for example, by a processor node 14 to a memory bank 80 address which resides on the memory node 18. The memory node 18 also acts as a data bus responder if the data requested resides on the memory node 18; else, the node on which the requested data resides acts as a data bus responder.

Referring back to FIG. 12, there is shown a memory node 18 including a memory address bus interface 60 and a memory data bus interface 62. The memory data bus interface 62 includes a memory commander data bus interface circuit 160 which is coupled to the data bus 46. The memory data bus interface 62 also includes a memory responder data bus interface circuit 162 which controls the movement of data between the DATA<255:0> signals on the data bus 46 and a memory data bus 164.

Figure 22A:
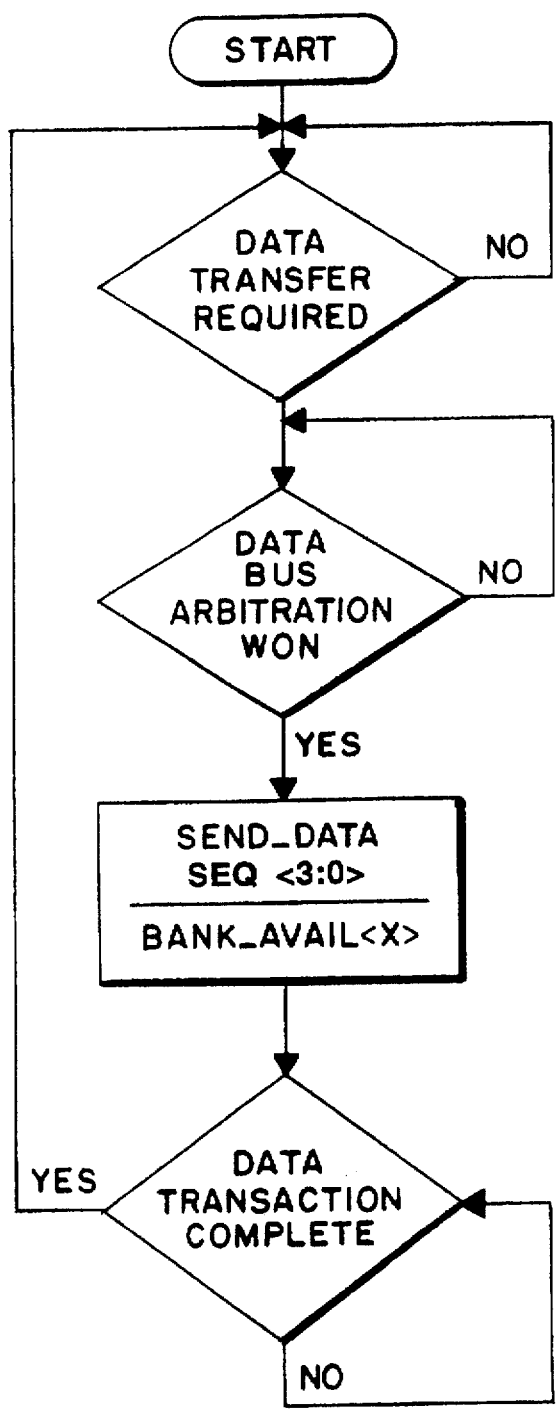
FIG. 22A is a flow diagram of the memory commander data bus interface of FIG. 12.
Figure 22B:
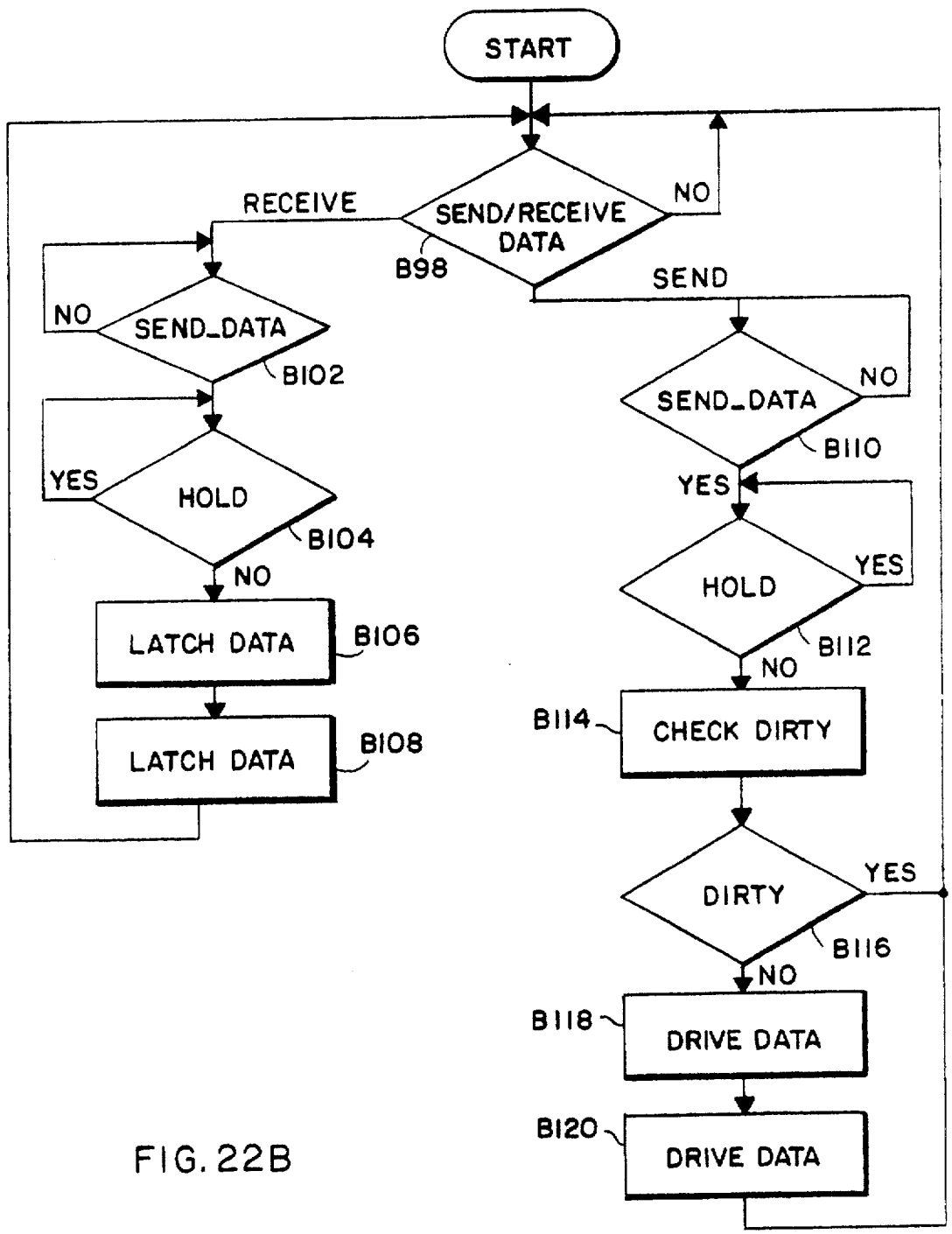
FIG. 22B is a flow diagram of the memory responder data bus interface of FIG. 12.

A flow diagram of the memory data bus interface 62 is shown in FIGS. 22A and 22B. FIG. 22A represents the operation of the memory commander data bus interface circuit 160, while FIG. 22B represents the operation of the memory responder data bus interface circuit 162.

Memory Commander Data Bus Interface

As a result of an address and command transaction which occurred earlier on the address bus 44 requesting a data transfer from the memory node 18 (B90), the memory commander data bus interface circuit 160 waits until the sequence tracker 144 (FIG. 1, FIG. 19) indicates that it is time for the memory node 18 to become a data bus commander, as described earlier (B92). When the sequence tracker 144 detects that the memory node 18 should begin a data transaction, the memory commander data bus interface circuit 160 asserts the SEND_DATA and SEQ<3:0>, and the appropriate BANK_AVL signal (B94). When the data transaction is complete, the memory commander data bus interface circuit 160 waits until it is again its turn to become a data bus commander as indicated by the sequence tracker 144 (B96).

Memory Responder Data Bus Interface

When the memory node 18 needs to transfer data as a result of an address and command transaction which occurred earlier on the address bus 44 requesting the data transfer (B98), the memory responder data bus interface circuit 162 waits for the assertion of SEND_DATA (B102). If the requested data transfer is a memory write transfer, the memory responder data bus interface circuit 162 then checks to see if the HOLD signal is asserted (B104). When the hold signal is de-asserted, data is latched into the memory responder data bus interface circuit 162 over two successive clock cycles (B106, B108), and forwarded on to the DRAM banks 80.

If the requested data transfer is a memory read transfer, the memory responder data bus interface circuit 162 again waits for the assertion of SEND_DATA (B110) and then checks for the assertion of the HOLD signal (B112). When HOLD is de-asserted the memory responder data bus interface circuit 162 then checks the DIRTY signal (B114). If the DIRTY signal is asserted (B116), the memory responder data bus interface circuit 162 does not respond to the read request, and instead returns to an idle state to wait for the next relevant data transaction, while the data bus responder that asserted DIRTY returns the requested data. If however the DIRTY signal is deasserted, the memory responder data bus interface circuit 162 drives data onto the data bus 46 over the next two successive CLK cycles (B118, B120).

2.4 I/O Data Bus Interface

An I/O node such as I/O node 26 can act as a data bus commander in the event that another node has requested data from a device or I/O bus to which the I/O node is coupled (FIG. 1). For example, a processor node 14 might intitiate an address and command transaction on the address bus 44 requesting a CSR read of a register on the I/O node 26. In this case, the I/O node also acts as the data bus responder for purposes of transferring the requested data. The I/O node also acts as a data bus responder for data transactions which occur as a result of address and command transactions earlier intiated by the I/O node 26 itself—such as a memory read or a read bank lock command, or a memory write or a write bank lock command.

Referring back to FIG. 14 there is shown an I/O node 26 including an I/O address bus interface 64 and an I/O data bus interface 66. The I/O data bus interface 66 includes an I/O commander data bus interface circuit 166 and an I/O responder data bus interface circuit 168, both coupled to the data bus 46. Within the I/O responder data bus interface circuit 168 are transceivers 170 which control the movement of data between the DATA<255:0> signals on the data bus 46 and an I/O data bus 46.

Figure 23A:
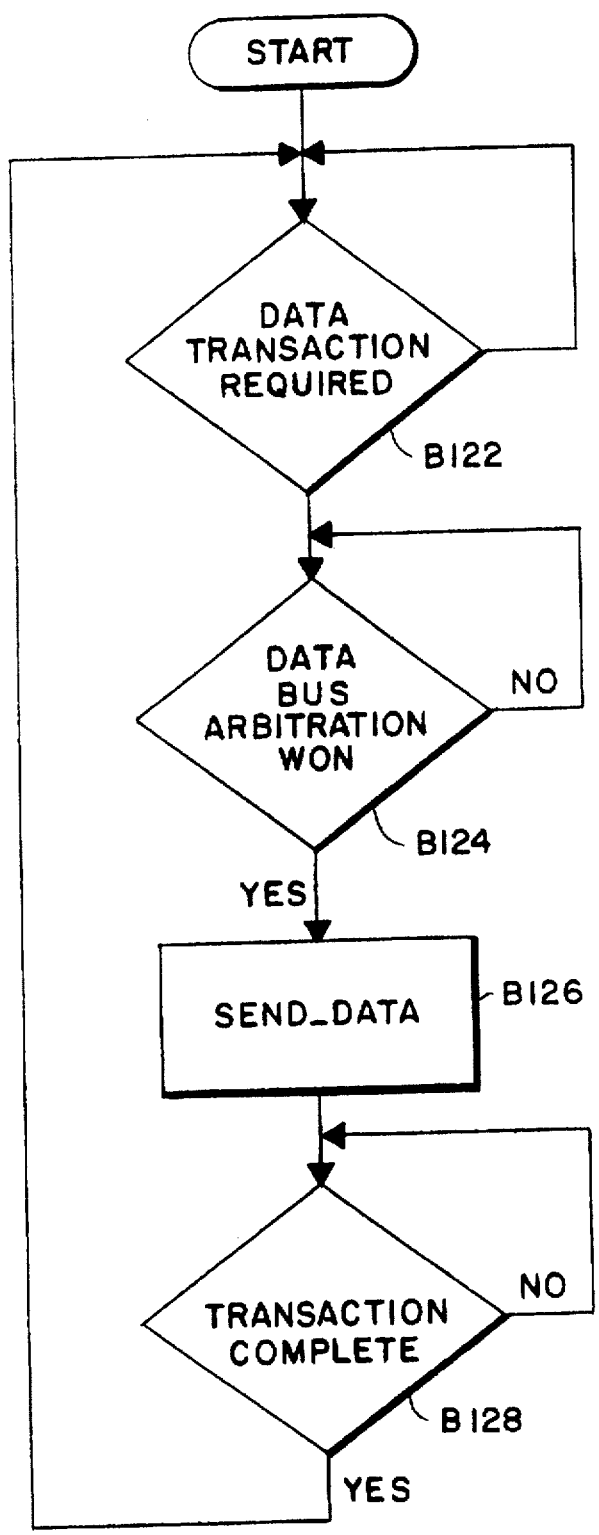
FIG. 23A is a flow diagram of the I/O commander data bus interface of FIG. 14.
Figure 23B:
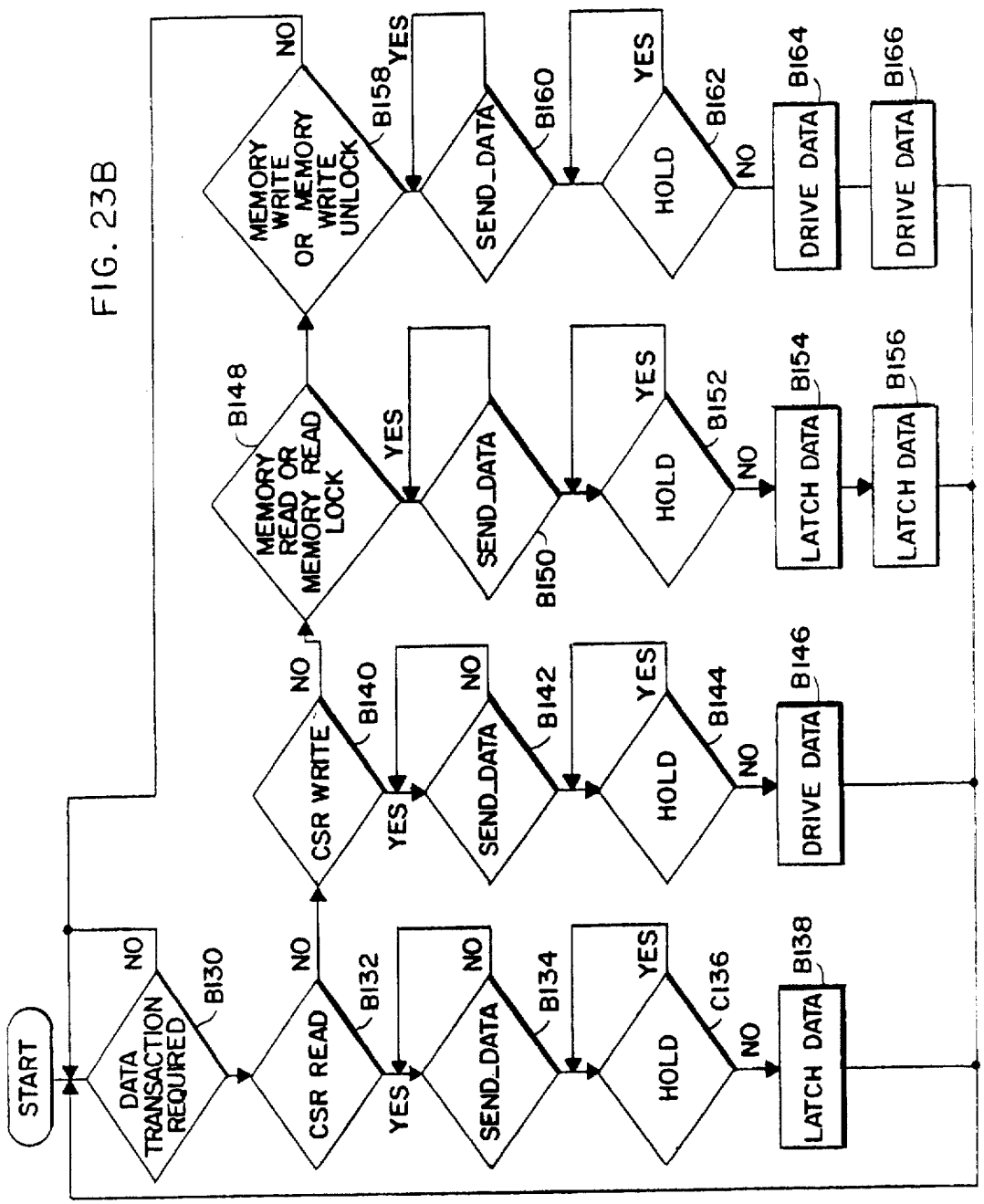
FIG. 23B is a flow diagram of the I/O responder data bus interface of FIG. 14.

A flow diagram of the I/O data bus interface 66 is shown in FIGS. 23A and 23B. FIG. 23A represents the operation of the i/O commander data bus interface circuit 166, while FIG. 23B represents the operation of the I/O responder data bus interface circuit 168.

I/O Commander Data Bus Interface

Referring now to FIG. 23A, as a result of an address and command transaction which occurred earlier on the address bus 44 requesting a data transfer from the I/O node 26 (B122), the I/O commander data bus interface circuit 166 arbitrates for control of the data bus 46 via the sequence tracker 144 (FIG. 1, FIG. 19), as described earlier (B124). When the sequence tracker 144 detects that the I/O node 26 should begin a data transaction, the I/O commander data bus interface circuit 166 asserts the SEND DATA and SEQ<3:0> signals (B126). When the data transaction is complete, the I/O commander data bus interface circuit 166 resumes data bus 46 arbitration.

I/O Responder Data Bus Interface

Referring now to FIG. 23B, the I/O responder data bus interface circuit 168 completes data transactions depending on the type of operation that was initiated (B130). If the I/O node is ready to transfer data as a result of an earlier address and command transaction that commanded a CSR read of a register on the I/O node 26, the I/O responder data bus interface circuit 168 awaits the assertion of the SEND_DATA signal (B134), which in this case is asserted by the I/O commander data bus interface circuit 166. It then checks for a HOLD signal assertion. Following the NO_HOLD cycle, data is driven onto the data bus 46 from the CSR register by the I/O responder data bus interface circuit 168 (B138).

If the I/O node is ready to transfer data as a result of an earlier address and command transaction that commanded a CSR write of a register on the I/O node 26 (B140), the I/O responder data bus interface circuit 168 awaits the assertion of the SEND_DATA (B142) signal by the I/O commander data bus interface circuit 166. It then checks for a HOLD signal assertion (B144). Following the NO_HOLD cycle, data is latched from the data bus 46 and forwarded to the CSR register by the I/O responder data bus interface circuit 168 (B146).

If the I/O node 26 is ready to transfer data as a result of an earlier address and command transaction that was initiated by the I/O node 26 and commanded a memory read or read bank lock of a memory bank 80 on a memory node 18 (B148), the I/O responder data bus interface circuit 168 awaits the assertion of the SEND_DATA signal (B150), which in this case is asserted by the memory node 18 memory commander data bus interface circuit 160. It then checks for a HOLD signal assertion (B152). Following the NO_HOLD cycle, data is latched from the data bus 46 by the I/O responder data bus interface circuit 168 during two successive CLK cycles and forwarded to the device interface 132 (B154, B156).

If the I/O node 26 is ready to transfer data as a result of an earlier address and command transaction that was initiated by the I/O node 26 and commanded a memory write or write bank unlock of a memory bank 80 on a memory node 18 (B158), the I/O responder data bus interface circuit 168 awaits the assertion of the SEND_DATA signal by the memory node 18 memory commander data bus interface circuit 160 (B160). It then checks for a HOLD signal assertion (B162). Following the NO_HOLD cycle, data is driven onto the data bus 46 by the I/O responder data bus interface circuit 168 from the device interface 132 over two successive CLK cycles (B164, B166).

Figure 24:
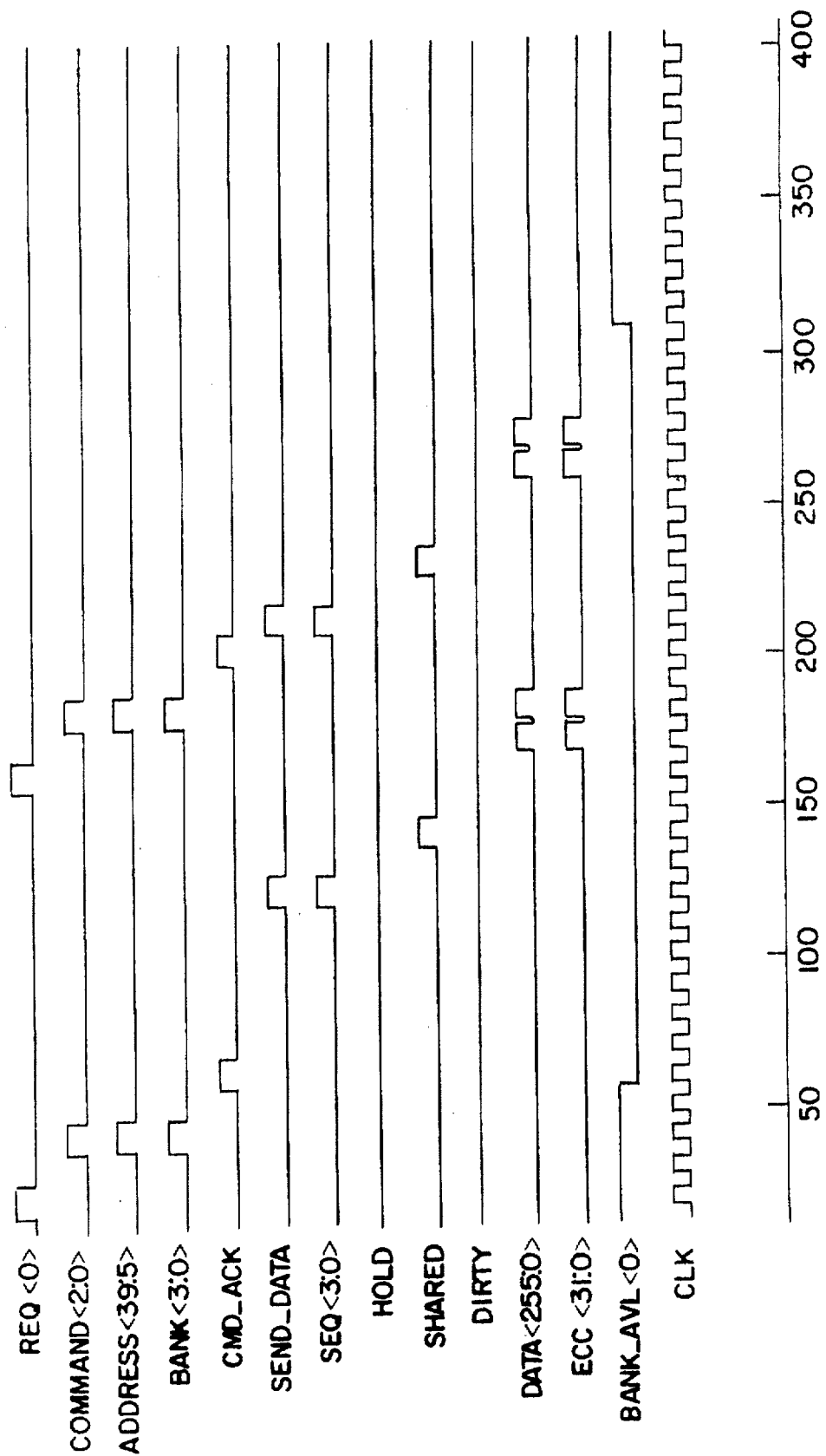
FIG. 24 is a timing diagram of a read bank lock transaction followed by a write bank unlock transaction.

FIG. 24 shows a read bank lock operation followed by a write bank unlock operation to a bank 0 on the memory node 18. Note that BANK_AVL<0> remains de-asserted until completion of the write bank unlock operation.

2.5 Processor Data Bus Interface

A processor node such as processor node 14 may need to respond to several types of commands via its processor data bus interface 54 (FIG. 1), including commands initiated by itself and commands initiated by another node. The processor node 14 may have initiated a CSR read or write to a CSR register on its own module or on another node, or the processor node 14 may have initiated a memory read or a memory write or a victim write to a memory node such as memory node 18. Alternatively, the processor node may need to respond to a CSR read or write initiated by another node and targeting one of its CSR registers, or it may have to respond to a memory read or write operation initiated by another processor node by driving cache status on the SHARED and DIRTY lines.

Figure 25:
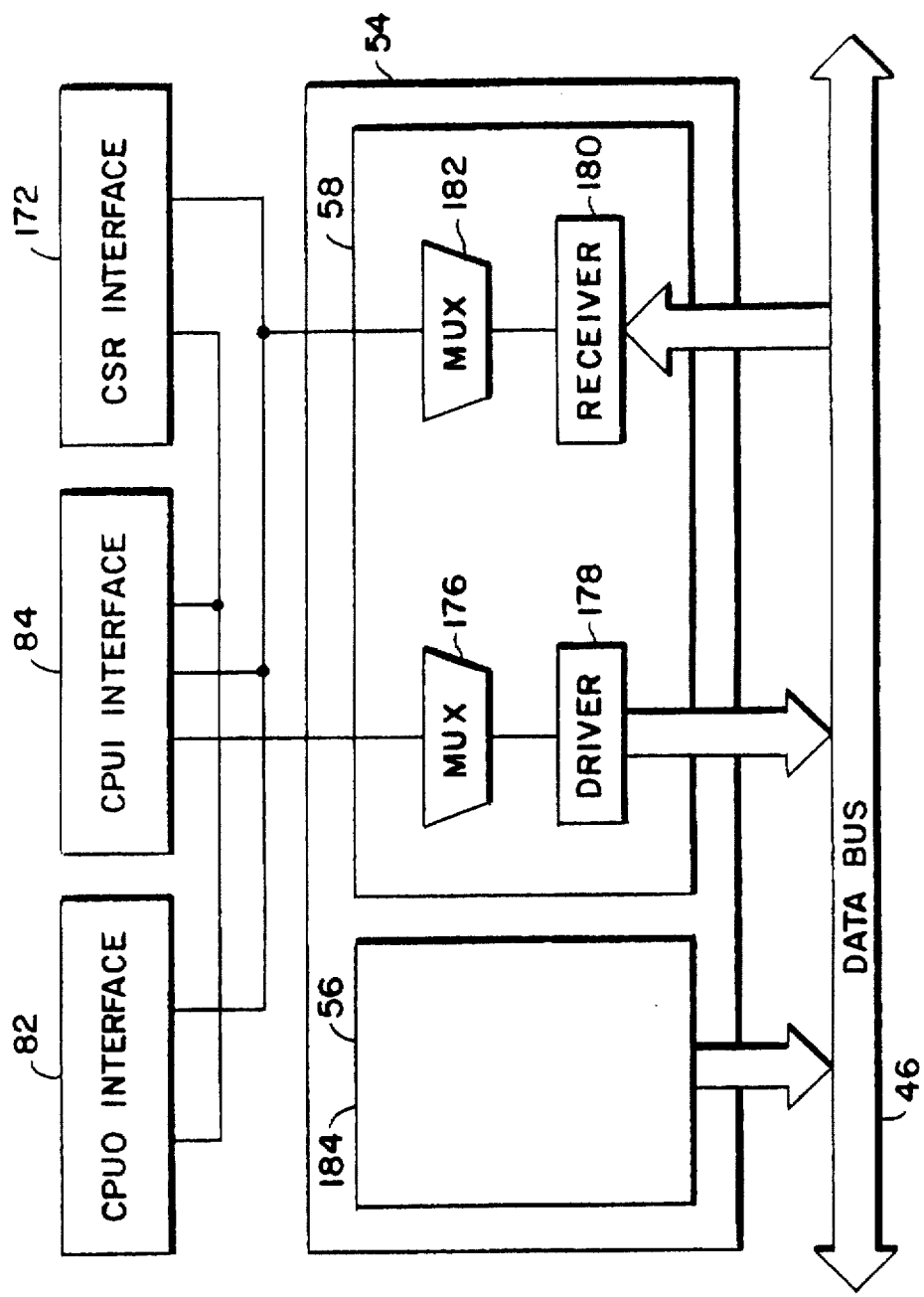
FIG. 25 is a block diagram of the processor data bus interface of FIG. 1.

Referring now to FIG. 25, the processor data bus interface 54 for the processor node 14 is shown in further detail. The processor data bus interface 54 includes a commander data bus interface 56 and a responder data bus interface 58, both coupled to the data bus 46. The responder data bus interface 58 is further coupled to the CPU0 interface 82 and the CPU1 interface 84 (FIG. 3), and to CSR buffers 172. Within the processor responder data bus interface 174 a write multiplexor 176 directs data from either the CPU0 interface 82, CPU1 interface 84, or the CSR buffers 172 to data bus drivers 178 which drive the DATA and ECC signals on the data bus 46. Receive buffers 180 feed the data and ECC information on the DATA and ECC signals to a read multiplexor 182, which directs the data to either the CPU0 interface 82, CPU1 interface 84, or the CSR buffers 172.

Processor Commander Data Bus Interface

Figure 26:
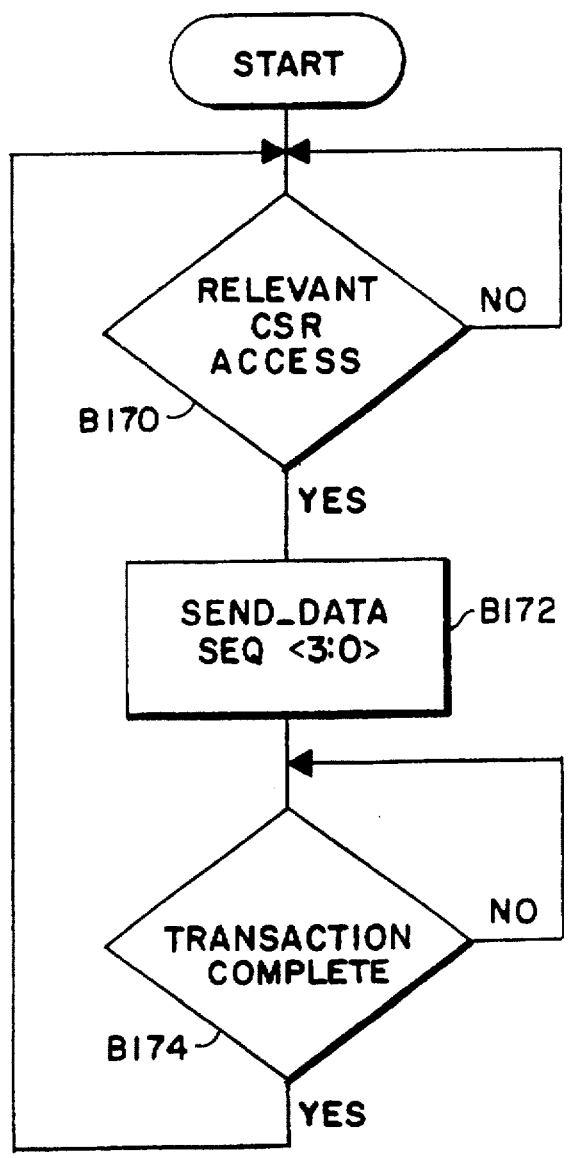
FIG. 26 is a flow diagram of the operation of the processor commander data bus interface of FIG. 25.

In FIG. 26 there is shown a flow diagram of the operation of the processor commander data bus interface 184. The processor node 14 becomes a data bus commander, for example, for CSR accesses to registers resident on the node. The CSR access may have been initiated by the processor node 14 itself, or by another node.

The processor commander data bus interface 184 arbitrates for the data bus 46. If the processor node 14 or another node such as processor node 16 has previously issued an address and command transaction on the address bus 44 requesting a CSR access to a CSR for which the processor node 14 should respond (B170), the processor commander data bus interface 184 asserts the SEND DATA and SEQ<3:0> signals on the data bus 46 (B172). When the CSR data transaction is complete, the processor commander data bus interface 184 resumes data bus arbitration.

Processor Responder Data Bus Interface

Figure 27A:
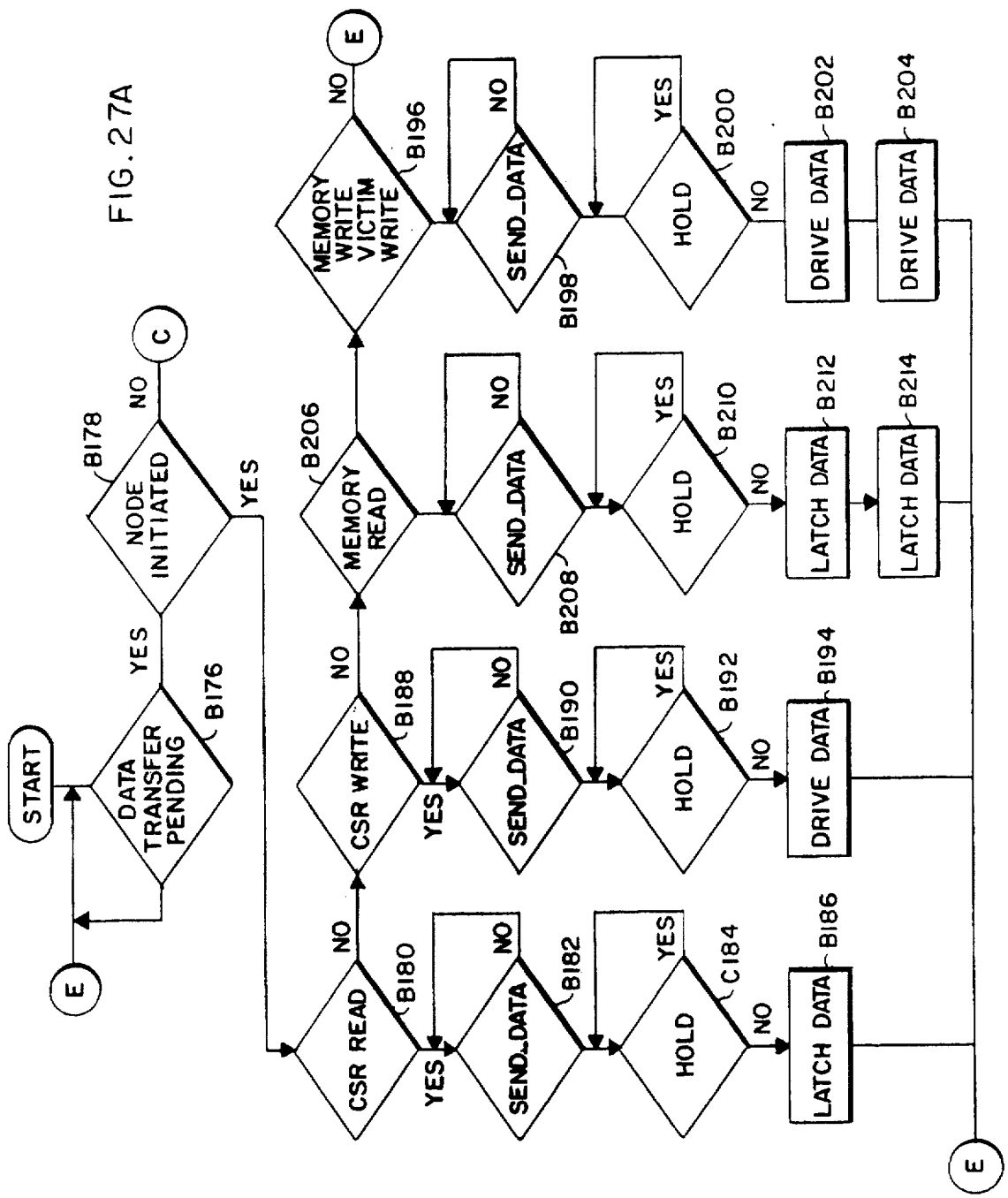
FIG. 27A is a flow diagram of the operation of the processor responder data bus interface of FIG. 25 for node-initiated transactions.
Figure 27B:
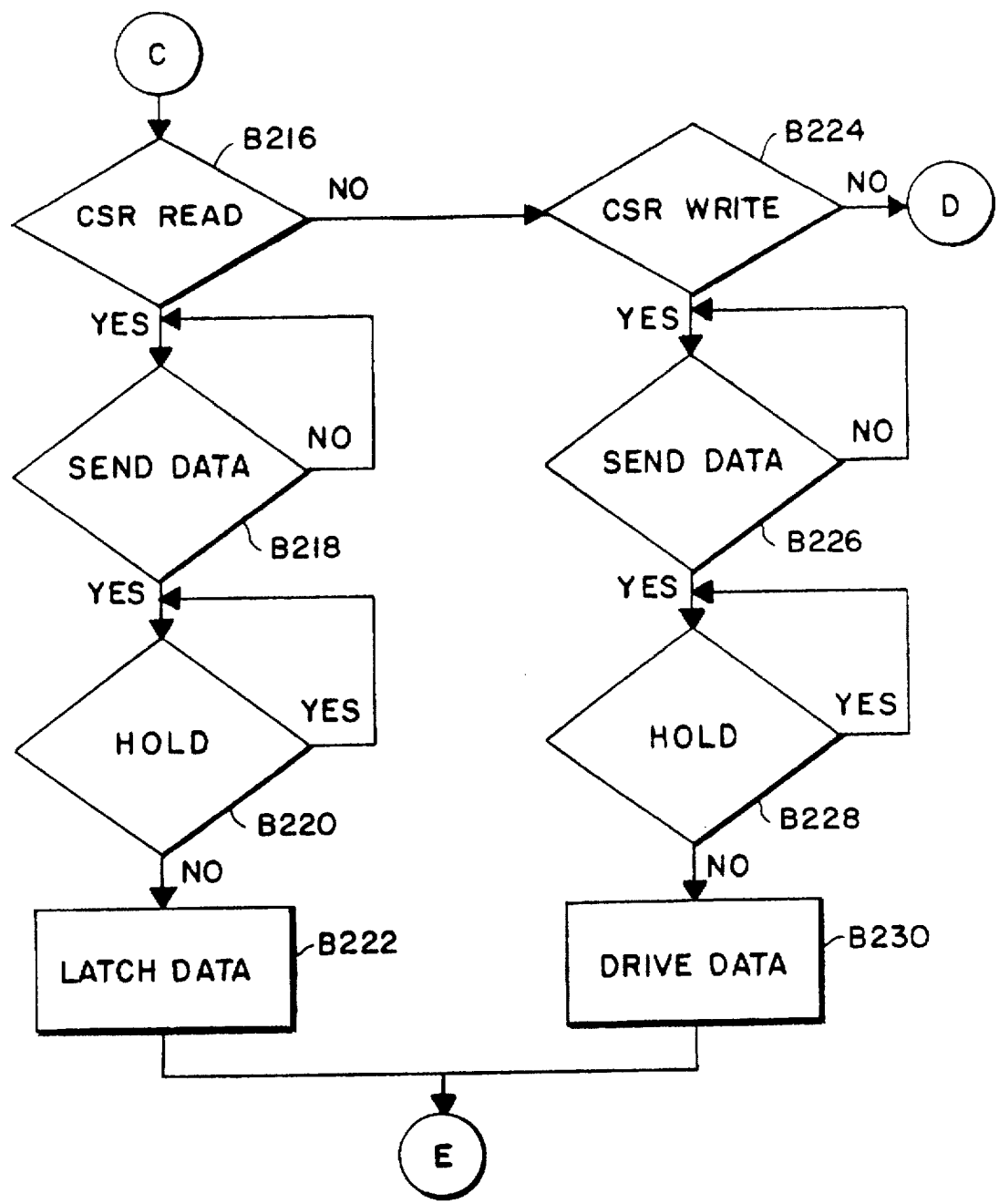
FIG. 27B is a flow diagram of the operation of the processor responder data bus interface of FIG. 25 for non-node-initiated transactions.
Figure 27C:
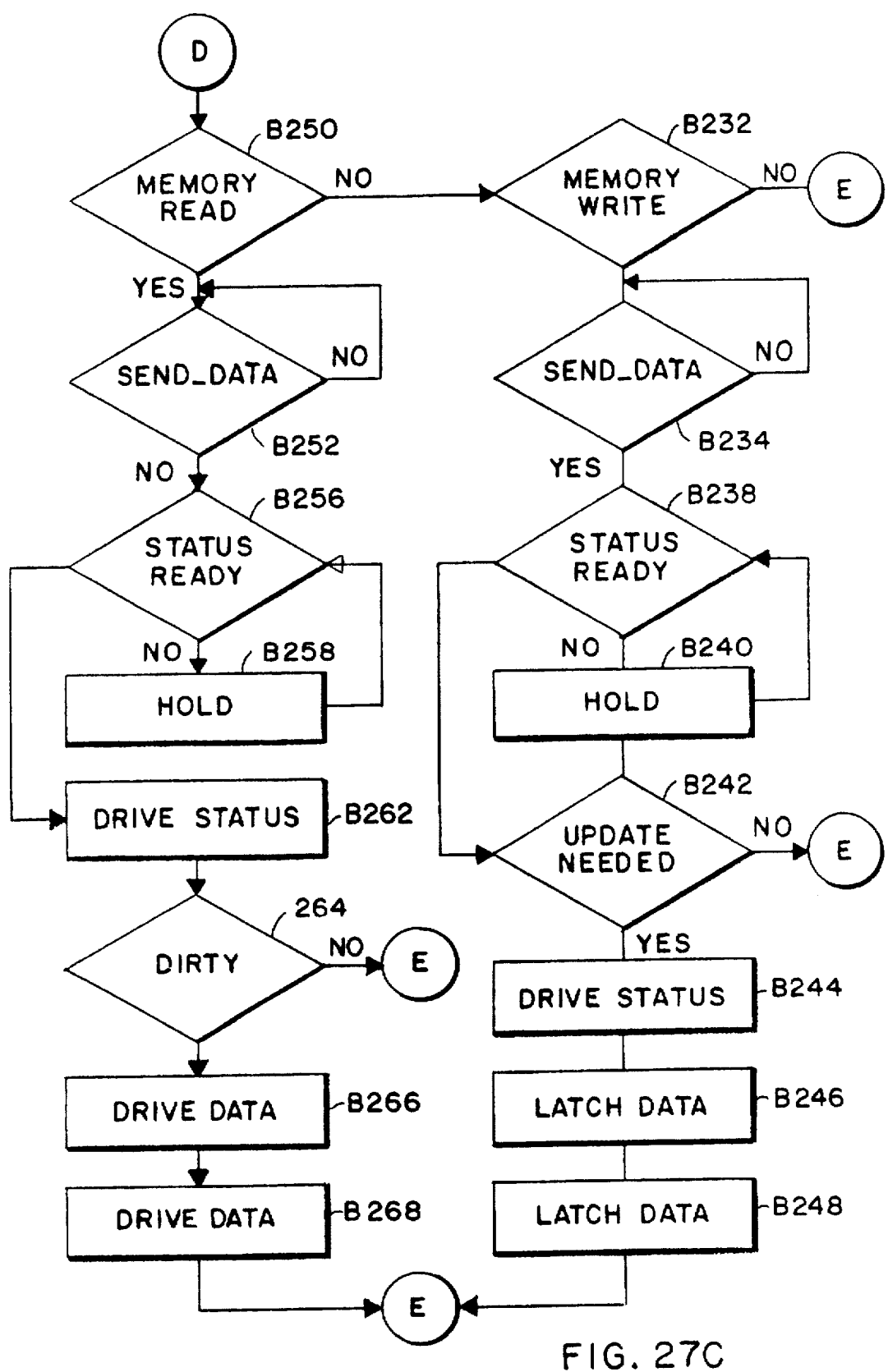
FIG. 27C is a flow diagram of the operation of the processor responder data bus interface of FIG. 25 for non-node-initiated memory transations.

In FIGS. 27A, 27B and 27C there is shown a flow diagram of the operation of the processor responder data bus interface 174. FIG. 27A shows the operation of the processor responder data bus interface 174 for processor node 14 initiated operation. FIGS. 27B and 27C show the operation of the processor responder data bus interface 174 for non-processor 14 initiated operations.

Referring to FIG. 27A, if the processor node 14 processor responder data bus interface 174 is responding to a processor node 14 initiated operation (B178), and if the operation is a CSR read of a CSR register on the processor node 14 (B180), the responder data bus interface awaits the assertion of SEND_DATA (B182)—in this case, by the processor node 14 commander data bus interface. When SEND_DATA is detected, the processor responder data bus interface 174 checks for the assertion of the HOLD signal (B184). Following the NO_HOLD cycle, the read multiplexor 176 directs data from the CSR buffers 172 onto the data bus 46 (B186). The processor responder data bus interface 174 furthermore latches the data on the data bus 46 into its receive buffers 186, since the processor node 14 itself initiated the CSR read operation. The contents of the receive buffers 186 are then directed via the read multiplexor 176 to the device that initiated the operation; for example, if CPU 68 on the processor node 14 initiated the CSR read, the contents of the receive buffers 186 are directed to the CPU0 interface 82.

If the processor node 14 processor responder data bus interface 174 is responding to a processor node 14 initiated operation (B178), and if the operation is a CSR write of a CSR register on the processor node 14 (B188), the responder data bus interface awaits the assertion of SEND_DATA—again, by the processor node 14 processor commander data bus interface 184 (B190). When SEND_DATA is detected, the processor responder data bus interface 174 checks for the assertion of the HOLD signal (B192). Following the NO_HOLD cycle, the processor responder data bus interface 174 drives the CSR data onto the data bus 46 via the data bus drivers 178 (B194). The data to be written is directed from the source that initiated the operation; for example, if CPU 68 on the processor node 14 requested the CSR write, the write multiplexor 182 directs data from the CPU0 interface 84 to the data bus drivers 178. Furthermore, the processor responder data bus interface 174 latches the data on the data bus 46 into its receive buffers 186, since the processor node 14 itself initiated the CSR write operation to a CSR register on the node. The contents of the receive buffers 186 are then directed via the read multiplexor 176 to the CSR buffers 172.

If the processor node 14 processor responder data bus interface 174 is responding to a processor node 14 initiated operation (B178), and if the operation is a memory write operation targeting a memory bank 80 on the memory node 18 (B196), the processor responder data bus interface 174 awaits the assertion of SEND_DATA, in this case by the memory node 18 (B198). When SEND_DATA is detected, the responder data bus interface checks for the assertion of the HOLD signal (B200). Following the NO_HOLD cycle, the processor responder data bus interface 174 drives data onto the data bus 46 over two successive CLK cycles (B202, B204). If, for example, the CPU 70 on the processor node 14 initiated the memory write operation, the write multiplexor 182 directs data from the CPU1 interface 84 to the data bus drivers 178.

If the processor node 14 processor responder data bus interface 174 is responding to a processor node 14 initiated operation (B178), and if the operation is a memory read of a block of data on a memory bank 80 on the memory node 18 (B206), the processor responder data bus interface 174 awaits the assertion of SEND_DATA by the memory node 18 (B208). When SEND_DATA is detected, the processor responder data bus interface 174 checks for the assertion of the HOLD signal (B210). Following the NO_HOLD cycle, the processor responder data bus interface 174 latches data from the data bus 46 during two successive CLK cycles (B212, B214). The latched data is directed via the read multiplexor 176 to the source that initiated the operation; for example, if the CPU 68 requested the memory read, the data is directed to the CPU1 interface 84.

Referring to FIG. 27B, if the data transaction is associated with a non-processor node 14 intiated operation, and if the operation is a CSR read of a CSR register on the processor node 14 (B216), the processor responder data bus interface 174 awaits the assertion of SEND_DATA (B218)—in this case, by the node that initiated the CSR read address and command transaction on the address bus 44. When SEND_DATA is detected, the processor responder data bus interface 174 checks for the assertion of the HOLD signal (B220). Following the NO_HOLD cycle, the processor responder data bus interface 174 directs data from the CSR buffers 172 to the data bus drivers via the write multiplexor 182 (B222).

If the processor node 14 processor responder data bus interface 174 is responding to a non-processor node 14 initiated operation, and if the operation is a CSR write of a CSR register on the processor node 14 (B224), the processor responder data bus interface 174 awaits the assertion of SEND_DATA—again, by the node that initiated the CSR read operation on the address bus 44. When SEND_DATA is detected (B226), the processor responder data bus interface 174 checks for the assertion of the HOLD signal (B228). Following the NO_HOLD cycle, the processor responder data bus interface 174 latches the data on the data bus 46 into the CSR buffers 172.

Referring to FIG. 27C, if the processor node 14 processor responder data bus interface 174 is responding to a non-processor node 14 initiated operation, and if the operation is a memory write targeting a memory bank 80 on the memory node 18 (B232), the processor responder data bus interface 174 awaits the assertion of SEND_DATA (B234), in this case by the memory node 18.

When SEND_DATA is detected, if the processor node 14 is operating according to a conditional write update protocol, and if the cache status of the requested block cannot be driven on the data bus via the SHARED and DIRTY signals upon the assertion of SEND_DATA (B238), the processor responder data bus interface 174 asserts the HOLD signal (B240). When cache status can be driven, HOLD is de-asserted. If the cache status of the block indicates that a cache update is needed in either cache 72 or 74 (B242), the responder data bus interface drives cache status on the SHARED and DIRTY lines (B244), and then latches data from the data bus during two successive CLK cycles (B246, B248). If the cache status of the block indicates that no cache update is needed, no further action is taken.

If the processor node 14 processor responder data bus interface 174 is responding to a non-processor node 14 initiated operation, and if the operation is a memory read of a block of data on a memory bank 80 on the memory bank 18 (B250), the processor responder data bus interface 174 awaits the assertion of SEND_DATA by the memory node 18 (B252). When SEND_DATA is detected, the processor responder data bus interface 174 checks the cache status of the requested block in the caches 72 and 74 (B254). If the cache status of the block is not available upon the assertion of SEND_DATA (256), the responder data bus interface asserts the HOLD signal (258). When cache status can be driven, HOLD is de-asserted and cache status is driven on the SHARED and DIRTY lines. If the status of the block is DIRTY, the DIRTY data is driven onto the data bus 46 over two successive CLK cycles.

Figure 28:
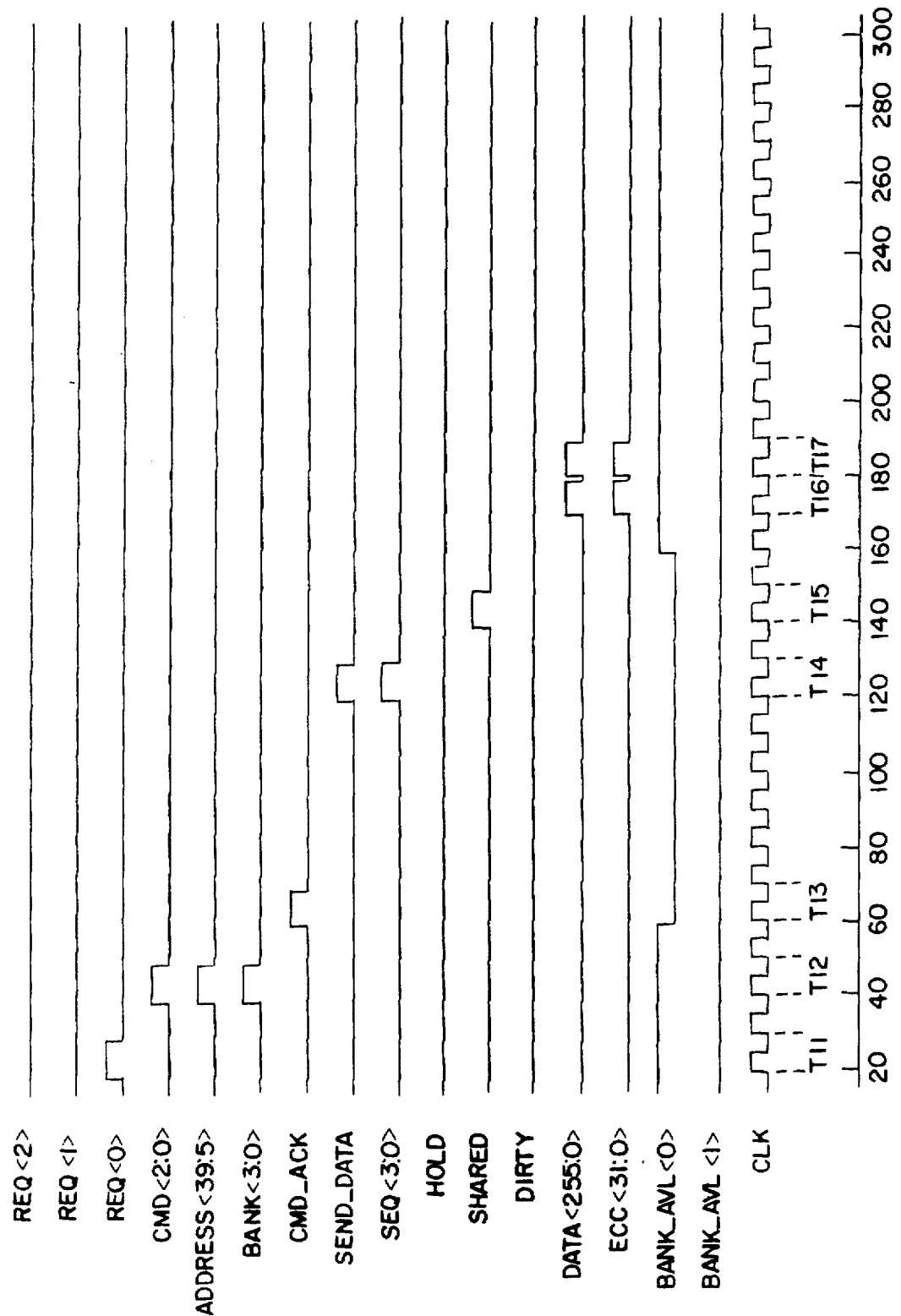
FIG. 28 is a timing diagram of a complete memory read transaction on the system bus of FIG. 1.

Referring to FIG. 28, there is shown a complete memory read operation initiated by a processor node 14 to a memory bank 80 on a memory node 18 according to the principles of the invention. To begin the memory read operation, the processor node 14 requests control of the address bus 44 via the request line REQ<0> (T11). Since no other requests are pending, the processor node 14 wins address bus arbitration to become an address bus commander. The processor node 14 drives the ADDRESS <39:5>, CMD<2:0>, and BANK<3:0> lines via its commander address bus interface 50 (FIG. 1), initiating an address and command transaction (T12). The memory node 18, acting as an address bus responder, acknowledges the address and command transaction by asserting the CMD_ACK signal via its address bus responder interface 52, and drives the appropriate BANK_AVL signal—in this case, BANK_AVL<0> (T13). At a later time, the memory node 18 arbitrates for control of the data bus 46 via the data bus sequencer 144. When data bus arbitration has been won, the memory node 18, acting as a data bus commander, asserts the SEND_DATA signal via its commander data bus interface 56 to initiate a data transaction (T14). Other nodes such as processor node 16, acting as data bus responders, drive cache status on the SHARED and DIRTY lines via their responder data bus interfaces 58 in response to the assertion of SEND_DATA (T15). Finally, the memory node 18, acting as a data bus responder, drives data and ECC information on the data bus 46 DATA and ECC lines via its responder data bus interface 58, thereby completing the data transaction and the memory read operation (T16, T17).

Having described a preferred embodiment of the invention, it will now become apparent that other embodiments incorporating its concepts may be used. The bus interfaces have been described in adherence with a particular cache protocol; however, one skilled in the art will realize that separate address and data bus interfaces can be employed according to the principles of the invention to adhere to any type of cache protocol, or to no cache protocol for lower performance systems that do not implement multi-node caching. Accordingly it is felt that the invention should not be limited to the disclosed embodiments but rather should be limited only by the spirit and scope of the appended claims.

What is claimed is:

1. A bus interface for a node in a computer system comprising:

a commander address bus interface for providing to an address bus address and command transactions;

a responder address bus interface for acknowledging receipt of address and command transactions via the address bus;

a commander data bus interface for controlling submission to a data bus separate from the address bus of data transactions associated with address and command transactions on the address bus, the data transactions being submitted to the data bus independently of the occurrence of the associated address and command transactions on the address bus;

a responder data bus interface for transferring data on the data bus during a data transaction;

wherein the commander address bus interface, the responder address bus interface, the commander data bus interface, and the responder data bus interface operate synchronously with a clock signal; and wherein the commander address bus interface comprises means for asserting an address bus flow control signal for controlling the rate at which address and command transactions are submitted to the address bus.

2. The bus interface of claim 1 wherein the responder data bus interface further comprises means for asserting a data bus flow control signal for controlling the rate at which data transactions occur on the data bus.

3. A bus interface for a node comprising:

a commander address bus interface for submitting an address and command transaction to an address bus on which address and command transactions occur;

a responder data bus interface for responding to a data transaction on a data bus separate from the address bus, the data transactions initiated on the data bus by another node, the responder data bus interface transferring data between the node and the another node, the data being associated with the address and command transaction submitted by the commander address bus interface to the address bus independently of the occurrence of the associated address and command transaction on the address bus;

wherein the commander address bus interface and the responder data bus interface operate synchronously with a clock signal; and wherein the commander address bus interface further comprises means for asserting an address bus flow control signal for controlling the rate at which address and command transactions are submitted to the address bus.

4. The bus interface of claim 3 wherein the responder data bus interface further comprises means for asserting a data bus flow control signal for controlling the rate at which data transactions occur on the data bus.

5. A computer system comprising:

a synchronous system bus comprising an address bus and a data bus separate from the address bus;

a first node coupled to the system bus, the first node comprising:

a commander address bus interface for providing to the address bus address and command transactions;

a responder address bus interface for acknowledging receipt of address and command transactions via the address bus;

a commander data bus interface for controlling submission to the data bus of data transactions as a result of the occurrence of address and command transactions on the address bus, each of the data transactions being associated with one of the address and command transactions, the data transactions being submitted to the data bus independently of the occurrence of address and command transactions on the address bus;

a responder data bus interface for transferring data on the data bus during a data transaction; and a second node coupled to the system bus, the second node comprising:

a responder address bus interface for acknowledging receipt of address and command transactions via the address bus;

a commander data bus interface for controlling submission to the data bus of data transactions as a result of the occurrence of address and command transactions on the address bus, each of the data transactions being associated with one of the address and command transactions, the data transactions being submitted to the data bus independently of the occurrence of address and command transactions on the address bus;

a responder data bus interface for transferring data on the data bus during a data transaction; and wherein the commander address bus interface of the first node comprises means for asserting an address bus flow control signal for controlling the rate at which address and command transactions are submitted to the address bus.

6. The computer system of claim 5 wherein the second node further comprises a commander address bus interface for providing to the address bus address and command transactions.

7. The bus interface of claim 5 wherein the responder data bus interface means of the first node and the responder data bus interface means of the second node further comprise means for asserting a data bus flow control signal for controlling the rate at which data transactions occur on the data bus.

8. A computer system comprising:

a synchronous system bus comprising an address bus and a data bus separate from the address bus;

a plurality of nodes coupled to the system bus, each node comprising at least one of:

a commander address bus interface for providing to the address bus address and command transactions;

a responder address bus interface for acknowledging receipt of address and command transactions via the address bus;

a commander data bus interface for controlling submission to the data bus of data transactions as a result of the occurrence of address and command transactions on the address bus, each of the data transactions being associated with one of the address and command transactions on the address bus, the data transactions being submitted to the data bus independently of the associated address and command transactions on the address bus;

a responder data bus interface for transferring data on the data bus during a data transaction;

wherein the timing of the data transactions and the rate at which the data transactions occur on the data bus is independent of the timing of address and command transactions and the rate at which address and command transactions occur on the address bus; and wherein the commander address bus interface for each node further comprises means for asserting an address bus flow control signal for controlling the rate at which address and command transactions are submitted to the address bus.

9. The bus interface of claim 8 wherein the responder data bus interface for each node further comprises means for asserting a data bus flow control signal for controlling the rate at which data transactions occur on the data bus.

10. A bus interface for a node in a computer system comprising:
- an address bus interface for providing to an address bus address and command transactions and for acknowledging receipt of address and command transactions via the address bus;
- a data bus interface for controlling submission to a data bus separate from the address bus of data transactions associated with address transactions occurring on the address bus and for transferring data on the data bus during the data transactions, the data transactions being submitted to the data bus independently of the occurrence of the associated address and command transactions on the address bus;
- wherein the address bus interface and the data bus interface operate synchronously with a clock signal; and
- wherein the address bus interface includes means for asserting an address bus flow control signal for controlling the rate at which address and command transactions are submitted to the address bus.

11. A bus interface for a node in a computer system according to claim 10, wherein the data bus interface includes means for asserting a data bus flow control signal for controlling the rate at which data transactions occur on the data bus.

12. A bus interface for a node in a computer system comprising:
- an address bus interface for providing to an address bus address and command transactions and for acknowledging receipt of address and command transactions via the address bus, the address bus interface including means for asserting an address bus flow control signal for controlling the rate at which address and command transactions are submitted to the address bus;
- a data bus interface for controlling submission of data transactions associated with the address transactions occurring on the address bus to a data bus separate from the address bus and for transferring data on the data bus during the data transactions, the data bus interface including means for asserting a data bus flow control signal for controlling the rate at which data transactions occur on the data bus; and
- wherein the address bus interface and the data bus interface operate synchronously with a clock signal.

* * * * *